(12) United States Patent
Ng et al.

(10) Patent No.: US 8,683,009 B2
(45) Date of Patent: *Mar. 25, 2014

(54) WIRELESS SYNCHRONIZATION BETWEEN MEDIA PLAYER AND HOST DEVICE

(75) Inventors: Stanley Ng, Campbell, CA (US); Anthony M. Fadell, Portola Valley, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,655

(22) Filed: Mar. 29, 2012

(65) Prior Publication Data

US 2012/0191811 A1    Jul. 26, 2012

Related U.S. Application Data

(63) Continuation of application No. 10/987,649, filed on Nov. 12, 2004, now Pat. No. 8,150,937.

(60) Provisional application No. 60/622,304, filed on Oct. 25, 2004.

(51) Int. Cl.
*G06F 15/16* (2006.01)

(52) U.S. Cl.
USPC .......................... 709/217; 709/218; 709/219

(58) Field of Classification Search
USPC ........................................................ 709/217
See application file for complete search history.

(56) References Cited

U.S. PATENT DOCUMENTS

| | | |
|---|---|---|
| 5,535,381 A | 7/1996 | Kooper |
| 5,559,945 A | 9/1996 | Beaudet et al. |
| 5,583,993 A | 12/1996 | Foster et al. |
| 5,587,404 A | 12/1996 | Kroner et al. |
| 5,616,876 A | 4/1997 | Cluts |
| 5,640,566 A | 6/1997 | Victor et al. |
| 5,666,530 A | 9/1997 | Clark et al. |
| 5,710,922 A | 1/1998 | Alley et al. |
| 5,721,949 A | 2/1998 | Smith et al. |

(Continued)

FOREIGN PATENT DOCUMENTS

| | | |
|---|---|---|
| EP | 0 917 077 | 5/1999 |
| EP | 0 982 732 | 3/2000 |

(Continued)

OTHER PUBLICATIONS

"SyncML Data Sync Protocol version 1.1.2" Open Mobile Alliance, Jun. 12, 2003, 1-63 pgs.

(Continued)

*Primary Examiner* — Shripal Khajuria
(74) *Attorney, Agent, or Firm* — Novak Druce Connolly Bove + Quigg LLP

(57) ABSTRACT

Improved techniques for interaction between a host computer (e.g., personal computer) and a media player are disclosed. According to one embodiment, interaction between a host device (e.g., host computer) and a media player can be performed over a wireless channel. The interaction over the wireless channel can be used to automatically synchronize media contents stored on the media player with media contents stored on the host device. According to another embodiment, interaction between a host device and a media player, such as automatic synchronization of media contents stored on a media player with media contents stored on a host device, can be restricted. In still another embodiment, synchronization can be automatically performed when the media player is placed in a docking station that supports wireless communications.

24 Claims, 13 Drawing Sheets

(56) References Cited

U.S. PATENT DOCUMENTS

| | | |
|---|---|---|
| 5,727,202 A | 3/1998 | Kucala |
| 5,739,451 A | 4/1998 | Winksy et al. |
| 5,745,583 A | 4/1998 | Koizumi et al. |
| 5,751,997 A | 5/1998 | Kullick et al. |
| 5,832,510 A | 11/1998 | Ito et al. |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,867,668 A | 2/1999 | Spirakis et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,963,916 A | 10/1999 | Kaplan |
| 5,969,283 A | 10/1999 | Looney et al. |
| 6,000,000 A | 12/1999 | Hawkins et al. |
| 6,006,274 A | 12/1999 | Hawkins et al. |
| 6,038,199 A | 3/2000 | Pawlowski et al. |
| 6,041,023 A | 3/2000 | Lakhansingh |
| 6,061,306 A | 5/2000 | Buchheim |
| 6,125,369 A | 9/2000 | Wu et al. |
| 6,138,245 A | 10/2000 | Son et al. |
| 6,172,948 B1 | 1/2001 | Keller et al. |
| 6,208,044 B1 | 3/2001 | Viswanadham et al. |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,247,135 B1 | 6/2001 | Feague |
| 6,248,946 B1 | 6/2001 | Dwek |
| 6,263,313 B1 | 7/2001 | Milsted et al. |
| 6,272,545 B1 | 8/2001 | Flanagin et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,345,256 B1 | 2/2002 | Milsted et al. |
| 6,356,971 B1 | 3/2002 | Katz et al. |
| 6,380,947 B1 | 4/2002 | Stead |
| 6,389,467 B1 | 5/2002 | Eyal |
| 6,411,943 B1 | 6/2002 | Crawford |
| 6,429,880 B2 | 8/2002 | Marcos et al. |
| 6,453,281 B1 | 9/2002 | Walters et al. |
| 6,490,432 B1 | 12/2002 | Wegener et al. |
| 6,493,758 B1 | 12/2002 | McLain |
| 6,523,124 B1 | 2/2003 | Lunsford et al. |
| 6,529,804 B1 | 3/2003 | Draggon et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,621,768 B1 | 9/2003 | Keller et al. |
| 6,636,873 B1 | 10/2003 | Carini et al. |
| 6,664,981 B2 | 12/2003 | Ashe et al. |
| 6,665,803 B2 | 12/2003 | Lunsford et al. |
| 6,694,200 B1 | 2/2004 | Naim |
| 6,718,348 B1 | 4/2004 | Novak et al. |
| 6,721,489 B1 | 4/2004 | Benyamin et al. |
| 6,731,312 B2 | 5/2004 | Robbin |
| 6,760,721 B1 | 7/2004 | Chasen et al. |
| 6,763,345 B1 | 7/2004 | Hempleman et al. |
| 6,779,019 B1 | 8/2004 | Mousseau et al. |
| 6,785,542 B1 | 8/2004 | Blight et al. |
| 6,794,566 B2 | 9/2004 | Pachet |
| 6,801,964 B1 | 10/2004 | Mahdavi |
| 6,831,881 B2 | 12/2004 | Patil et al. |
| 6,874,037 B1 | 3/2005 | Abram et al. |
| 6,925,595 B1 | 8/2005 | Whitledge et al. |
| 6,928,433 B2 | 8/2005 | Goodman et al. |
| 6,956,562 B1 | 10/2005 | O'Hara et al. |
| 6,959,288 B1 | 10/2005 | Medina et al. |
| 6,978,127 B1 | 12/2005 | Bulthuis et al. |
| 6,987,221 B2 | 1/2006 | Platt |
| 6,993,532 B1 | 1/2006 | Platt et al. |
| 6,999,826 B1 | 2/2006 | Zhou et al. |
| 7,010,758 B2 | 3/2006 | Bate |
| 7,022,905 B1 | 4/2006 | Hinman et al. |
| 7,024,214 B2 | 4/2006 | Loveland |
| 7,024,491 B1 | 4/2006 | Hanmann et al. |
| 7,039,656 B1 | 5/2006 | Tsai et al. |
| 7,069,058 B2 | 6/2006 | Kawashima |
| 7,075,000 B2 | 7/2006 | Gang et al. |
| 7,111,009 B1 | 9/2006 | Gupta |
| 7,130,892 B2 | 10/2006 | Mukai |
| 7,136,934 B2 | 11/2006 | Carter et al. |
| 7,146,322 B2 | 12/2006 | Cowgill |
| 7,194,692 B2 | 3/2007 | Marcos et al. |
| 7,281,141 B2 | 10/2007 | Elkayam et al. |
| 7,283,880 B2 | 10/2007 | Dick |
| 7,295,983 B2 | 11/2007 | Fujiwara et al. |
| 7,471,988 B2 | 12/2008 | Smith et al. |
| 7,647,346 B2 | 1/2010 | Silverman et al. |
| 7,680,849 B2 | 3/2010 | Heller et al. |
| 7,765,326 B2 | 7/2010 | Robbin et al. |
| 7,769,903 B2 | 8/2010 | Robbin et al. |
| 7,797,446 B2 | 9/2010 | Heller et al. |
| 8,150,937 B2 | 4/2012 | Ng et al. |
| 2001/0004310 A1 | 6/2001 | Kono |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0013784 A1 | 1/2002 | Swanson |
| 2002/0045960 A1 | 4/2002 | Phillips et al. |
| 2002/0046315 A1 | 4/2002 | Miller et al. |
| 2002/0055934 A1 | 5/2002 | Lipscomb et al. |
| 2002/0073139 A1 | 6/2002 | Hawkins et al. |
| 2002/0078075 A1 | 6/2002 | Colson et al. |
| 2002/0095663 A1 | 7/2002 | Joory |
| 2002/0113824 A1 | 8/2002 | Myers |
| 2002/0116082 A1 | 8/2002 | Gudorf |
| 2002/0118848 A1 | 8/2002 | Karpenstein |
| 2002/0133515 A1 | 9/2002 | Kagle et al. |
| 2002/0138606 A1 | 9/2002 | Robison |
| 2002/0156921 A1 | 10/2002 | Dutta |
| 2002/0161865 A1 | 10/2002 | Nguyen |
| 2002/0174243 A1 | 11/2002 | Spurgat et al. |
| 2002/0174269 A1 | 11/2002 | Spurgat et al. |
| 2002/0194309 A1 | 12/2002 | Carter et al. |
| 2003/0013493 A1 | 1/2003 | Irimajiri et al. |
| 2003/0030733 A1 | 2/2003 | Seaman et al. |
| 2003/0037254 A1 | 2/2003 | Fischer et al. |
| 2003/0046434 A1 | 3/2003 | Flanagin et al. |
| 2003/0050058 A1 | 3/2003 | Walsh et al. |
| 2003/0065802 A1 | 4/2003 | Vitikainen et al. |
| 2003/0074457 A1 | 4/2003 | Kluth |
| 2003/0076301 A1 | 4/2003 | Tsuk |
| 2003/0079038 A1 | 4/2003 | Robbin et al. |
| 2003/0097379 A1 | 5/2003 | Ireton |
| 2003/0112279 A1 | 6/2003 | Irimajiri |
| 2003/0158737 A1 | 8/2003 | Csicsatka |
| 2003/0167318 A1 | 9/2003 | Robbin et al. |
| 2003/0182315 A1 | 9/2003 | Plastina et al. |
| 2003/0191756 A1 | 10/2003 | Oh |
| 2003/0197725 A1 | 10/2003 | Tuli |
| 2003/0210821 A1 | 11/2003 | Yogeshwar et al. |
| 2003/0221541 A1 | 12/2003 | Platt |
| 2004/0001395 A1 | 1/2004 | Keller et al. |
| 2004/0001396 A1 | 1/2004 | Keller et al. |
| 2004/0003151 A1 | 1/2004 | Bateman et al. |
| 2004/0004338 A1 | 1/2004 | Benliyan |
| 2004/0017997 A1 | 1/2004 | Cowgill |
| 2004/0027930 A1 | 2/2004 | Kudo |
| 2004/0055446 A1 | 3/2004 | Robbin et al. |
| 2004/0068536 A1 | 4/2004 | Demers et al. |
| 2004/0076086 A1 | 4/2004 | Keller et al. |
| 2004/0078416 A1 | 4/2004 | Kawasaki et al. |
| 2004/0128198 A1 | 7/2004 | Register et al. |
| 2004/0139180 A1 | 7/2004 | White et al. |
| 2004/0139844 A1 | 7/2004 | Tsuboi |

(56) References Cited

U.S. PATENT DOCUMENTS

| | | |
|---|---|---|
| 2004/0193900 A1 | 9/2004 | Nair |
| 2004/0216108 A1 | 10/2004 | Robbin |
| 2004/0225762 A1 | 11/2004 | Poo |
| 2004/0236568 A1 | 11/2004 | Giuillen et al. |
| 2004/0242224 A1 | 12/2004 | Janik et al. |
| 2004/0252604 A1 | 12/2004 | Johnson et al. |
| 2004/0267825 A1 | 12/2004 | Novak et al. |
| 2005/0010616 A1 | 1/2005 | Burks |
| 2005/0055444 A1 | 3/2005 | Venkatasubramanian |
| 2005/0080915 A1 | 4/2005 | Shoemaker |
| 2005/0102329 A1 | 5/2005 | Jiang et al. |
| 2005/0147130 A1 | 7/2005 | Hurwitz et al. |
| 2005/0235015 A1 | 10/2005 | Abanami et al. |
| 2005/0240494 A1 | 10/2005 | Cue et al. |
| 2005/0240661 A1 | 10/2005 | Heller et al. |
| 2005/0262528 A1 | 11/2005 | Herley et al. |
| 2006/0027080 A1 | 2/2006 | Schultz |
| 2006/0090202 A1 | 4/2006 | Liu et al. |
| 2006/0100978 A1 | 5/2006 | Heller et al. |
| 2006/0106806 A1 | 5/2006 | Sperling |
| 2006/0143455 A1 | 6/2006 | Gitzinger |
| 2006/0159109 A1 | 7/2006 | Lamkin et al. |
| 2006/0168340 A1 | 7/2006 | Heller et al. |
| 2006/0168351 A1 | 7/2006 | Ng |
| 2006/0224620 A1 | 10/2006 | Silverman et al. |
| 2006/0230081 A1 | 10/2006 | Craswell |
| 2006/0288057 A1 | 12/2006 | Coffins et al. |
| 2007/0033052 A1 | 2/2007 | Cowgill |
| 2007/0038941 A1 | 2/2007 | Wysocki et al. |
| 2007/0067309 A1 | 3/2007 | Klein et al. |
| 2007/0073723 A1 | 3/2007 | Ramer et al. |
| 2007/0073728 A1 | 3/2007 | Klein et al. |
| 2007/0074118 A1 | 3/2007 | Robbin et al. |
| 2007/0084333 A1 | 4/2007 | Robbin et al. |
| 2007/0088727 A1 | 4/2007 | Kindig |
| 2007/0088764 A1 | 4/2007 | Yoon et al. |
| 2007/0124680 A1 | 5/2007 | Robbin et al. |
| 2007/0130541 A1 | 6/2007 | Louch et al. |
| 2007/0185919 A1 | 8/2007 | Kaplan et al. |
| 2007/0203954 A1 | 8/2007 | Vargas et al. |
| 2007/0220552 A1 | 9/2007 | Juster et al. |
| 2007/0271312 A1 | 11/2007 | Heller et al. |
| 2007/0291323 A1 | 12/2007 | Roncal |
| 2008/0018927 A1 | 1/2008 | Martin et al. |
| 2008/0028008 A1 | 1/2008 | Brunet et al. |
| 2008/0086494 A1 | 4/2008 | Heller et al. |
| 2008/0168185 A1 | 7/2008 | Robbin et al. |
| 2008/0168245 A1 | 7/2008 | DeAtley et al. |
| 2008/0168391 A1 | 7/2008 | Robbin et al. |
| 2008/0168525 A1 | 7/2008 | Heller |
| 2008/0168526 A1 | 7/2008 | Robbin et al. |
| 2009/0290725 A1 | 11/2009 | Huang |

FOREIGN PATENT DOCUMENTS

| | | |
|---|---|---|
| EP | 1 028 425 | 8/2000 |
| EP | 1 353 269 A | 10/2003 |
| EP | 1408427 A2 | 4/2004 |
| EP | 1 429 569 A | 6/2004 |
| EP | 1 548 740 | 6/2005 |
| JP | 2000-339917 | 12/2000 |
| JP | 2001-93226 | 4/2001 |
| JP | 2001-117800 | 4/2001 |
| JP | 2003-077214 | 3/2003 |
| JP | 2003-303137 | 10/2003 |
| JP | 2003-319485 | 11/2003 |
| KR | 10-2001-0063284 A | 7/2001 |
| KR | 10-2001-0079176 A1 | 8/2001 |
| KR | 10-2002-0011027 | 2/2002 |
| KR | 10-2002-0011027 A | 2/2002 |
| KR | 10-2006-0035634 A | 4/2006 |
| KR | 10-0599204 B1 | 7/2006 |
| WO | WO 94/08337 | 4/1994 |
| WO | WO 95/16950 | 6/1995 |
| WO | WO 00/43914 A1 | 7/2000 |
| WO | WO 01/33569 | 5/2001 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 03/036541 | 5/2003 |
| WO | WO 2004-004338 | 1/2004 |
| WO | WO 2004/034286 A1 | 4/2004 |
| WO | WO 2004/057474 | 7/2004 |
| WO | WO 2004/084413 | 9/2004 |
| WO | WO 2005/060387 A2 | 7/2005 |
| WO | WO 2005-114472 A1 | 12/2005 |
| WO | WO 2006/047578 A2 | 5/2006 |

OTHER PUBLICATIONS

"Apple Announces iTunes 2," Press Release, Apple Computer, Inc., Oct. 23, 2001.

"Apple Introduces iTunes—World's Best and Easiest To Use Jukebox Software," Macworld Expo, San Francisco, Jan. 9, 2001.

"Digital Still Cameras—Downloading Images to a Computer," Mimi Chakarova et al., Multi-Media Reporting and Convergence, Jan. 18, 2006, 2 pgs.

"Hewlett Packard Jornada 525 Color Pocket PC," downloaded Jan. 25, 2002, http://www.pc4d.com/electronics/products/56/jornada_525_color_pocket_pc.shtml.

"Nomad Jukebox," User Guide, Creative Technology Ltd., Version 1, Aug. 2000.

"Rio Portable Music Player," Web Review, downloaded Jan. 25, 2002, http://www.webreviews.com/9901/rio.html.

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.

"About MusicMatch Jukebox," MusicMatch Jukebox v4 Help, pp. 1-4, 1999.

Adam C. Engst, "SoundJam Keeps on Jammin'," Jun. 19, 2000, available from http://db.tidbits.com/getbits.acgi?tbart=05988.

Alicia Awbrey, press release entitled "Apple's iPod Available in Stores Tomorrow," Nov. 9, 2001.

Andrew Birrell, "Personal Jukebox (PJB)," Oct. 13, 2000 available from http://birrell.org/andrew/talks/pjb-overview.ppt.

Andy Lindauer, "What's in your Pocket?," Edgereview, downloaded Jan. 25, 2002, http://www.edgereview.com/print.cfm?Type=aag&ID=286.

Bridgman, "Windows XP Expert Zone Community Columist", Using Windows Mobile-based Portable Media Centers and Windows Media Player 10, Aug. 25, 2004, 1-11.

Compaq Computer Corp., copyright 1991, Personal Jukebox User Manual, pp. 1-29.

Compaq, "Personal Jukebox," Jan. 24, 2001, available from http://research.compaq.com/SRC/pjb/, 3 pgs.

De Herrera, Chris, "Microsoft ActiveSync 3.1," Version 1.02, Oct. 13, 2000.

Etchison, "Accelerated Discrete Adjustment of the Parameters of a Process", IBM Technical Disclosure Bulletin, vol. 15, No. 5, Oct. 1, 1972, 2 pgs.

Firewire, IEEE 1394 (also known as Sony's iLink), (http://www.wikipedia.org/wiki/Firewire (1995)).

Glenn Fleishman, "Handheld iPod joins MP3 band a bit late, but is standout player," Nov. 6, 2001, http://seattletimes.nwsource.com/html/businesstechnology/134361811_ptmacc040.html.

Handbook for Palm™ m500 Series Handhelds, User Manual, copyright 1998-2001.

International Search Report and Written Opinion for corresponding PCT application No. PCT/US2005/034272 dated Jan. 27, 2006.

Iriver, "PMP140/120", Sep. 13, 2004, 1-2 pgs.

iTunes 2, Playlist Related Help Screens, iTunes v2.0, Apple Computer, Inc., Oct. 23, 2001.

MG-25, Portable MPEG4 Player (MG-25), Jul. 29, 2004, 1-3 pgs.

iTunes, Digital Music for your Mac, Apple Computer, Inc., downloaded Oct. 22, 2001, http://www.apple.com/itunes/.

(56) References Cited

OTHER PUBLICATIONS iTunes, Playlist Related Help Screens, iTunes v1.0, Apple Computer, Inc., Jan. 2001.
Lyra, Personal Digital Player, RCA, Product Box, 2003.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, available from http://www.musicmatch.com/info/company/press/releases/?year=1998&release=2.
Nutzel et al., "Sharing Systems for Future HiFi Systems", Proceedings of the Fourth International Conference on Web Delivering of Music, Sep. 13, 2008, 8 pgs.
Personal Jukebox (PJB), "Systems Research Center and PAAD," Compaq Computer Corp., Oct. 13, 2000, http://research.compaq.com/SRC/pjb/.
RCA Lyra User's Guide, RD2201/2202/2204, www.lyrazone.com, pp. 1-37, 1999.
RealJukebox Plus Manual, Real Networks, Inc., copyright 1999, pp. 1-83, RealJukebox, Real Networks, Inc., webpages downloaded Oct. 27, 2005http://www.real.com/Jukebox/release_notes.html#.
Replay Gain, "Replay Gain—A proposed Standard," Oct. 7, 2001, available from http://replaygain.hydrogenaudio.org/index.html and http://replaygain.hydrogenaudio.org/outline.html.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
SoundJam MP Plus, Representative Screens, published by Casady & Greene, Inc., Salinas, CA 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, available from http://db.tidbits.com/getbits.acgi?tbart=06521.
Travis Butler, "Portable MP3: The Nomad Jukebox," Aug. 1, 2001, available from http://db.tidbits.com/getbits.acgi?tbart=06261.
TuneBase 100 User Guide, A CD Library Management System, Escient, Inc. copyright 1999.
TuneBase Pro Mk-II User's Guide, Escient, Inc., 1999.
Vetro et al., "Media Conversions to Support Mobile Users," IEEE Canadian Conference on Electrical and Computer Engineering, Piscataway, NJ, May 13, 2001, pp. 607-612.
Wikipedia: "iTunes", www.wikipedia.com, May 9, 2005, 6 pages.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Zheng et al., "MobiGATE: a mobile gateway proxy for the active deployment of transport entities," Proceedings of the 2004 International Conference on Parallel Processing, Piscataway, NJ, Aug. 15, 2004.
"Diamond Multimedia Announces Rio PMP300 Portable MP3 Music Player", Press Release, http://news.harmony-central.com/Newp/1998/Rio-PMP300.html, Sep. 14, 1998, 4 pgs.
M. Nilsson; ID3 tag version 2.3.0; Feb. 3, 1999, http://www.id3lib.org/id3v2.3.0.html.
M. Nilsson;IDS tag verions 2.4.0—Main Structure; Nov. 1, 2000; http://www.id3.org/id3v2.4.0-structure.
Office Action from EP Application No. 05801802.9, mailed Mar. 18, 2009.
Skarlatos et al., "Sprite Software Sprite Backup 5.0", Internet Publication, www.pocketnow.com/index.php?a+portal_print&t=review&id=788, Mar. 6, 2005.
Apple Inc., "Apple-Downloads-Dashboard", http://www.apple.com/downloads/dashboard, downloaded Dec. 16, 2008, pp. 1-2.
GUI Widget, Wikipedia.org., http://en.wikipedia.org.wiki/Widget_ (computing), downloaded Dec. 29, 2008, pp. 1-2.
Top Stores of Dec. 18, 2001: Apple posts Automated Scripts for iTunes 2.03. pp. 11, obtained from the internet at: http://www.xlr8yourmac.com.
iTunes-perl, copyright 2004-2006 by Jay McGavren, obtained from the Internet at http://code.google.com, pp. 7.
Pocket Tunes 5.0.0, copyright 2002-2009 Normsoft, Inc., pp. 1-25, obtained from the Internet at: http://www.pocket-tunes.com.
Office Action for CN Application 200580040516.8 dated Feb. 5, 2010.
Notice of the Reason for Refusal for JP application No. 2007-538922, mailed Jan. 12, 2010.
"Perfect guide for digital/audio technique to enjoy music in PC", Nobuya Fukuda, published in "Nikkei Click", Japan, Nikkei business Publications, Inc., Sep. 8, 1999, vol. 6/No. 10, p. 169.
Bott, "Special Edition Using Microsoft 1-18 Windows Milennium Passage", Special Edition Using Microsoft Windows Millennium Edition, Nov. 3, 2000, pp. 1-24.
Second Office Action for Chinese Patent Application No. 200580040516.8, dated Jul. 28, 2011 (with translation).
Notice of the Reason for Refusal for JP application No. 2007-538922, mailed Aug. 3, 2010.
U.S. Appl. No. 11/757,214, entitled "Intelligent synchronization of media player with host computer", filed Jun. 1, 2007.
Combined Search and Examination Report re: GB Application No. 0425738.2, dated Dec. 21, 2004.
Combined Search and Examination Report re: GB Application No. 0425740.8, dated Dec. 21, 2004.
Combined Search and Examination Report re: GB Application No. 0425742.4, dated Dec. 21, 2004.

WIRELESS SYNCHRONIZATION BETWEEN MEDIA PLAYER AND HOST DEVICE

CROSS-REFERENCE TO RELATED APPLICATIONS

This application is a continuation of U.S. application Ser. No. 10/987,649, filed Nov. 11, 2004, now U.S. Pat. No. 8,150,937 and entitled "WIRELESS SYNCHRONIZATION BETWEEN MEDIA PLAYER AND HOST DEVICE," which is hereby incorporated herein by reference, which in turn claims priority benefit of U.S. Provisional Application No. 60/622,304, filed Oct. 25, 2004, and entitled "WIRELESS SYNCHRONIZATION BETWEEN MEDIA PLAYER AND HOST DEVICE," which is hereby incorporated herein by reference.

This application is related to: (i) U.S. application Ser. No. 10/973,657, filed Oct. 25, 2004, and entitled "IMAGE SCALING ARRANGEMENT," which is hereby incorporated herein by reference; (ii) U.S. application Ser. No. 10/973,925, filed Oct. 25, 2004, and entitled "MULTIPLE MEDIA TYPE SYNCHRONIZATION BETWEEN HOST COMPUTER AND MEDIA DEVICE," which is hereby incorporated herein by reference; (iii) U.S. application Ser. No. 10/277,418, filed Oct. 21, 2002, and entitled "INTELLIGENT INTERACTION BETWEEN MEDIA PLAYER AND HOST COMPUTER," which is hereby incorporated herein by reference; and (iv) U.S. application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference.

BACKGROUND OF THE INVENTION

1. Field of the Invention

The present invention relates to media devices and, more particularly, to synchronization of media on media devices.

2. Description of the Related Art

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc. However, such synchronization schemes tend to utilize filenames and modification dates to determine whether files need to be copied between the devices. These synchronization schemes can be largely automated but nevertheless have to be initiated manually.

In the case of media players, such as MP3 players, files are typically moved between a host computer and a media player through use of a drag and drop operation, like is conventionally done with respect to copying of a data file from a Windows desktop to a floppy disk. Hence, the user of the media player manually initiates the synchronization for individual media items. As a consequence, synchronization tends to be tedious and time consuming for users.

More recently, media players have been able to be synchronized with a host computer when a bus connection over a cable is made. Here, the synchronization can be automatically initiated when the cable is connected between the host computer and the media player. The i Pod® offered by Apple Computer, Inc. of Cupertino, Calif. has the capability to provide such synchronization over a cable. Although such represents a dramatic improvement over prior approaches, one disadvantage with synchronization over a cable is that the cable connection must be made. A user can often forget to connect the cable. Without the cable connection, the synchronization will not occur. Further, the cable is normally relatively short in length, such as a few feet (e.g., 2-6 feet), so the media player must be brought within a few feet of the host computer for synchronization to occur.

Thus, there is a continuing need for improved techniques to synchronize media content on host computers and/or media players.

SUMMARY

Broadly speaking, the invention relates to interaction between a host computer (e.g., personal computer) and a media player. According to one embodiment of the invention, interaction between a host device (e.g., host computer) and a media player can be performed over a wireless channel. The interaction over the wireless channel can be used to automatically synchronize media contents stored on the media player with media contents stored on the host device. The synchronization can automatically be performed when the wireless channel is available between the media player and the media host. For example, the synchronization can be automatically performed when the media player that supports wireless communications is placed within a wireless network that also couples to the host device.

According to another embodiment of the invention, interaction between a host device and a media player, such as automatic synchronization of media contents stored on a media player with media contents stored on a host device, can be restricted. In one implementation, a given media player is able to automatically interact only with a designated host device. In still another embodiment, synchronization can be automatically performed when the media player is placed in a docking station that supports wireless communications. In one embodiment, the host device can be another media player, such that the interaction performed over a wireless channel is from one media player to another.

The invention can be implemented in numerous ways, including as a method, system, device, apparatus, or computer readable medium. Several embodiments of the invention are discussed below.

As a method for synchronizing media contents between a portable media player and a media host, one embodiment can include at least the acts of: determining whether a wireless connection between the media player and the media host is available; establishing the wireless connection between the media player and the media host when it is determined that the wireless connection is available; determining whether the media player is associated with the media host; synchronizing media content between the media player and the media host via the wireless connection when it is determined that the media player is associated with the media host.

As a computer readable medium including at least computer program code for synchronizing media contents between a portable media player and a media host, one embodiment can include at least: computer program code for determining whether a wireless connection between the media player and the media host is available; computer program code for establishing the wireless connection between the media player and the media host when it is determined that the wireless connection is available; computer program code for determining whether the media player is associated with the media host; and computer program code for synchronizing media content between the media player and the media host via the wireless connection when it is determined that the media player is associated with the media host.

As a method for synchronizing media contents between a portable media player and a media host, where the media content including a plurality of media items, one embodiment can, for example, include at least: determining whether the media player is connected to the media host by a wired connection; determining whether a wireless connection between the media player and the media host is available; determining whether the media player is associated with the media host; determining one or more of the media items to be copied from the media host to the media player; compressing at least a portion of the determined one or more of the media items to be copied prior to their being copied, said compressing forming determined one or more compressed media items to be copied; copying the determined one or more compressed media items to be copied from the media host to the media player via the wireless connection when said determining determines that the media player is not connected to the media host by a wired connection and when said determining determines that the media player is associated with the media host; and copying the determined one or more of the media items to be copied from the media host to the media player via the wire connection when said determining determines that the media player is connected to the media host by a wired connection and when said determining determines that the media player is associated with the media host.

As a non-transitory computer readable storage medium including at least computer program code stored thereon and executable by a computer for synchronizing media contents between a portable media player and a media host, the media content including a plurality of media items, one embodiment can, for example, include at least: computer program code for determining whether the media player is connected to the media host by a wired connection; computer program code for determining whether a wireless connection between the media player and the media host is available; computer program code for determining whether the media player is associated with the media host; computer program code for determining one or more of the media items to be copied from the media host to the media player; computer program code for compressing at least a portion of the determined one or more of the media items to be copied prior to their being copied, said compressing forming determined one or more compressed media items to be copied; computer program code for copying the determined one or more compressed media items to be copied from the media host to the media player via the wireless connection when said determining determines that the media player is not connected to the media host by a wired connection and when said determining determines that the media player is associated with the media host; and computer program code for copying the determined one or more of the media items to be copied from the media host to the media player via the wire connection when said determining determines that the media player is connected to the media host by a wired connection and when said determining determines that the media player is associated with the media host.

As a system for managing and playing media data, one embodiment of the invention includes at least a host computer, a portable media player and a docking station. The host computer includes at least a management module for managing a plurality of media items, a host play module for playing the media items for a user of the host computer, and a host media store for storing a plurality of media items. The portable media player includes at least a player media store for storing a plurality of media items, and a player play module for playing the media items stored in the media store for a user of the portable media player. The docking station for the portable media player includes wireless communication circuitry so that the portable media player can receive media items or media information from the host computer over a wireless channel via the wireless communication circuitry.

As a system for managing and playing media data, one embodiment of the invention includes at least a host computer, a portable media player, and another portable device. The host computer includes at least a management module for managing a plurality of media items, a host play module for playing the media items for a user of the host computer, and a host media store for storing a plurality of media items. The portable media player includes at least a player media store for storing a plurality of media items, and a player play module for playing the media items stored in the media store for a user of the portable media player. The another portable device is larger than the portable media player and can house the portable media player. The another portable device or the portable media player includes wireless communication circuitry so that the portable media player can receive media items or media information from the host computer over a wireless channel via the wireless communication circuitry.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention relates to interaction between a host computer (e.g., personal computer) and a media player. According to one embodiment of the invention, interaction between a host device (e.g., host computer) and a media player can be performed over a wireless channel. The interaction over the wireless channel can be used to automatically synchronize media contents stored on the media player with media contents stored on the host device. The synchronization can automatically be performed when the wireless channel is available between the media player and the media host. For example, the synchronization can be automatically performed when the media player that supports wireless communication is placed within a wireless network that also couples to the host device.

According to another embodiment of the invention, interaction between a host device and a media player, such as automatic synchronization of media contents stored on a media player with media contents stored on a host device, can be restricted. In one implementation, a given media player is able to automatically interact only with a designated host device. In still another embodiment, synchronization can be automatically performed when the media player is placed in a docking station that supports wireless communications. In one embodiment, the host device can be another media player, such that the interaction performed over a wireless channel is from one media player to another.

Embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
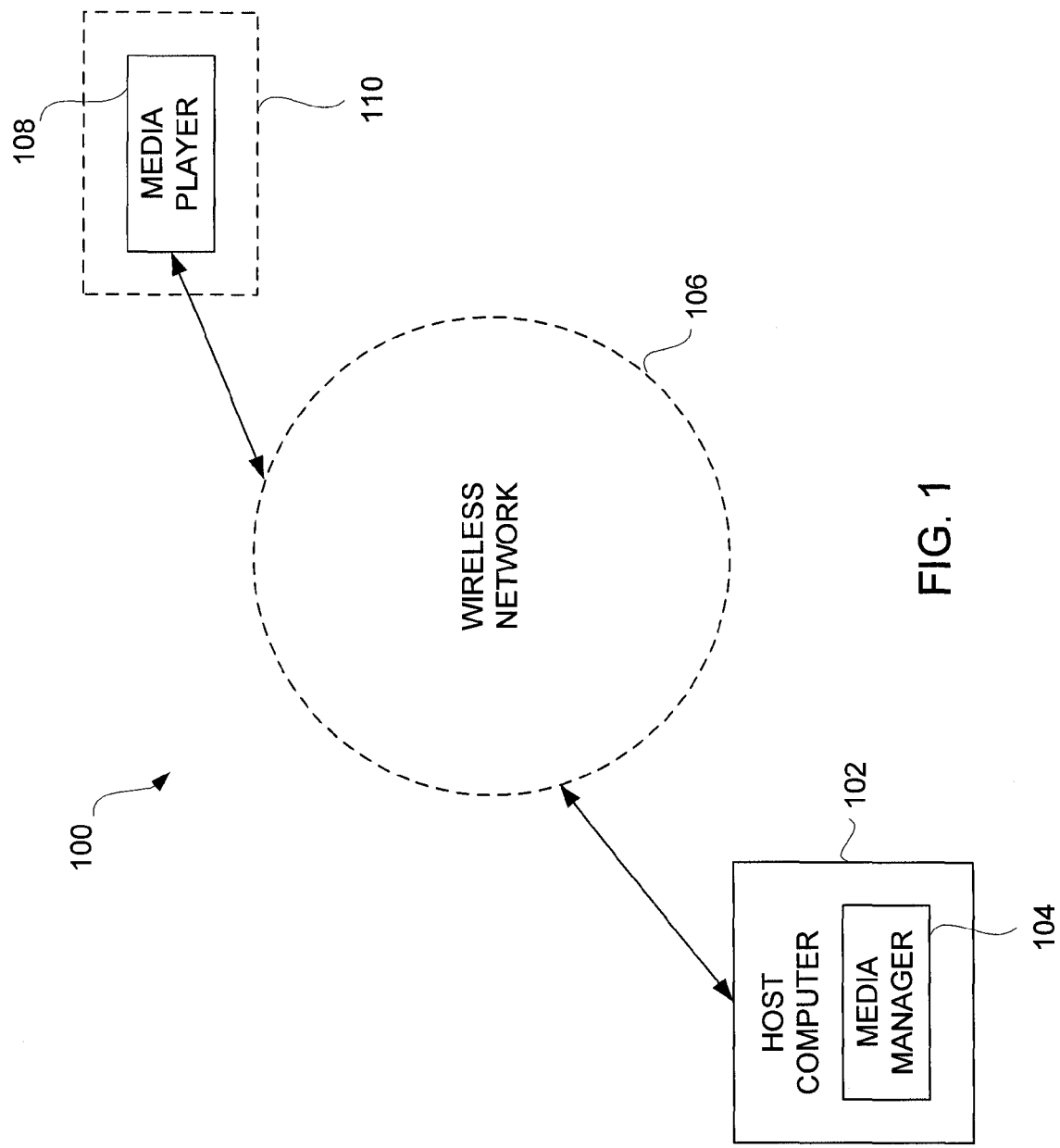
FIG. 1 is a block diagram of a wireless media synchronization system according to one embodiment of the invention.

FIG. 1 is a block diagram of a wireless media synchronization system 100 according to one embodiment of the invention. The wireless media synchronization system 100 includes a host computer 102. The host computer 102 operates a media manager 104. For example, the media manager 104 can be an application program that manages media when operated on the host computer 102. Additionally, the wireless media synchronization system 100 includes a wireless network 106. The wireless network 106 is able to be formed from one or more wireless network components. The wireless network 106 typically has a local area or a limited range. The infrastructure of the wireless network 106 can include one or more of 802.11 systems, Bluetooth systems, 900 MHz systems, or other localized wireless data transfer means. The wireless network 106 can be sponsored by the host computer 102 or some other device, such as a wireless router or hub. The host computer 102 and a media player 108 have wireless network communication capability with respect to the wireless network 106 and can support the wireless data protocols used by the wireless network 106. When the wireless network 106 is available, the media player 108 is able to communicate with the host computer 102 through the wireless network 106. This requires that the media player 108 be within range of the wireless network 106. For example, if the wireless network 106 has a maximum range of twenty-five (25) feet from the host computer 102, then in order for the media player 110 to be able to communicate to the host computer 102 over the wireless network 106, the media player 108 would need to be brought within twenty-five (25) feet of the host computer 102.

The media player 108 is, in general, a portable computing device. As an example, the media player 108 can be a handheld device that a user carries, such as a music player (e.g., MP3 player). Optionally, the media player 108 can be coupled to or within another device 110 that contains or supports the media player 108. In one embodiment, the another device 110 is a larger portable device, such as a backpack, brief case, bag or vehicle (e.g., an automobile). In another embodiment, the another device 110 is a docking station for the media player 108. The another device 110 can also provide or assist with support for wireless network communications capability.

Figure 2:
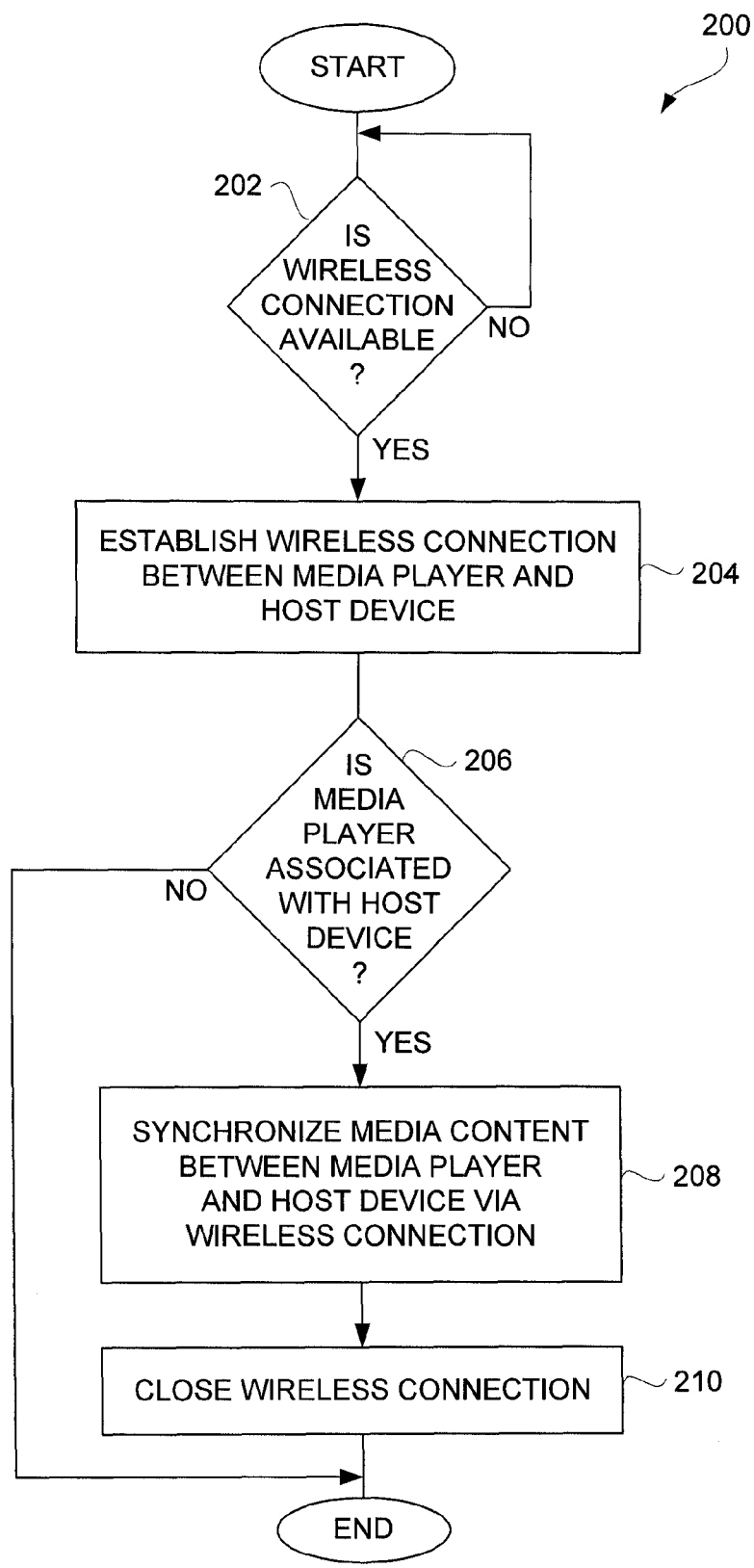
FIG. 2 is a flow diagram of a wireless synchronization process according to one embodiment of the invention.

FIG. 2 is a flow diagram of a wireless synchronization process 200 according to one embodiment of the invention. The wireless synchronization process 200 can, for example, be performed by a host device (media host) and/or a media player. The wireless synchronization process 200 begins with a decision 202 that determines whether a wireless connection is available. When the decision 202 determines that a wireless connection is not available, then the wireless synchronization process 200 can await the availability of a wireless connection. While awaiting the availability of the wireless connection, as discussed in other embodiments below, the wireless synchronization process 200 could delay (or deactivate and be subsequently reactivated) for a predetermined period of time.

In any case, once the decision 202 determines that a wireless connection is available, a wireless connection is established 204 between a host device and a media player. The specific wireless technology being utilized can vary, but the wireless technology is typically relatively short range. After the wireless connection has been established 204, a decision 206 determines whether the media player is associated with the host device. Here, the media player is associated with the host device if the host device and/or the media player understand that the media player is linked to the host device. In one embodiment, the host device can store a unique identifier (e.g., pseudo-random identifier) associated with the media player, and thereafter use the unique identifier to determine whether the media player is to be deemed associated with the host device.

When the decision 206 determines that the media player is associated with the host device, then media content between the media player and the host device is synchronized 208 via the wireless connection. This involves the transfer of media content between the media player and the host device over the wireless connection. After the synchronization 208 has been performed, the wireless connection can be closed 210.

It should be noted that in one implementation, the wireless synchronization process 200 is automatically invoked when a wireless connection is deemed to be available between the host device and a particular media player. In other words, the wireless synchronization process 200 can be automatically performed without specific user interaction with the media player or the host device to initiate the synchronization process.

It should be noted that the media items can vary depending upon application. Typically, a media item is a file that stores media content in a digital format. In one embodiment, media items can be audio files (e.g., songs). In other embodiments, the media items can be images (e.g., photographs) or videos. The media items can also include media information which is data that describes the associated media item.

Figure 3A:
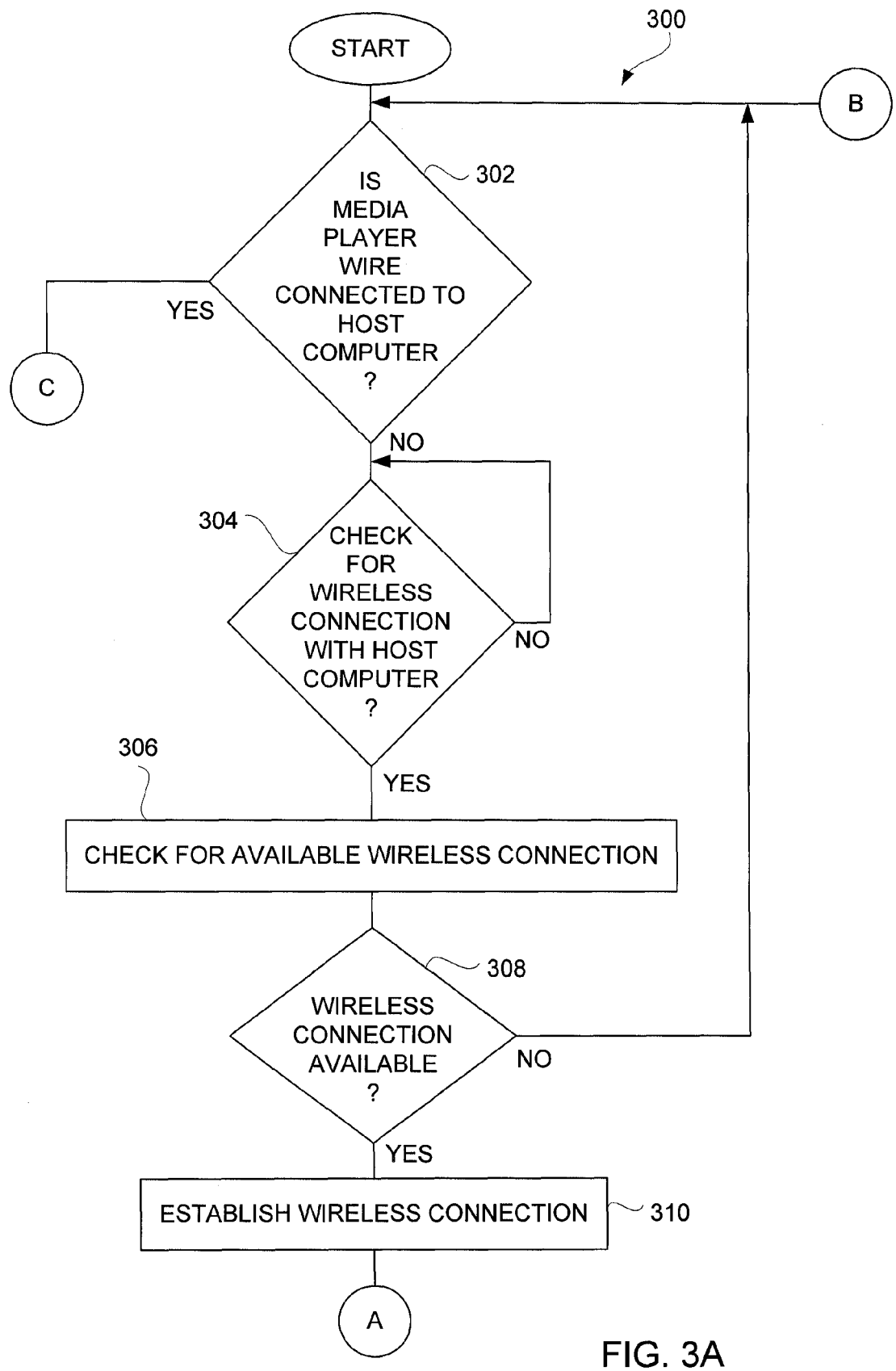
FIGS. 3A and 3B are flow diagrams of an automated synchronization process according to one embodiment of the invention.
Figure 3B:
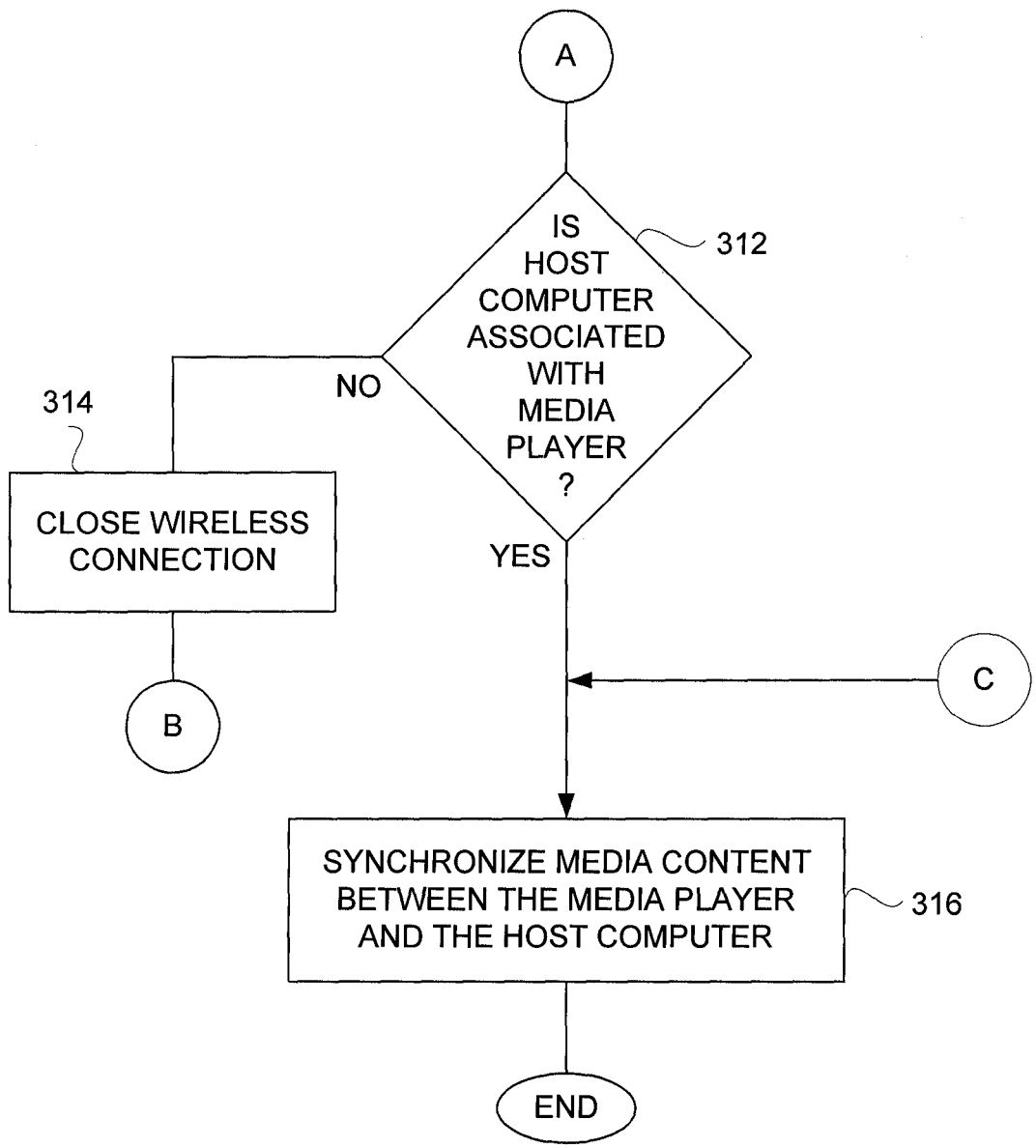

FIGS. 3A and 3B are flow diagrams of an automated synchronization process 300 according to one embodiment of the invention. The automated synchronization process 300 can, for example, be performed by a host computer and/or a media player.

The automated synchronization process 300 begins with a decision 302 that determines whether a media player is wire connected to a host computer. For example, a media player would be considered wire connected to the host computer if a FIREWIRE® or USB cable connects the media player to the host device. When the decision 302 determines that the media player is not wire connected to the host computer, then a decision 304 determines whether it is an appropriate time to again check for a wireless connection with the host computer. When the decision 304 determines that it is not an appropriate time to check for a wireless connection, then the automated synchronization process 300 simply awaits the appropriate time. In one implementation, the appropriate time can cause periodic checks for a wireless connection.

Once the decision 304 determines that it is an appropriate time to check for a wireless connection with the host computer, then availability of a wireless connection is checked 306. Thereafter, a decision 308 determines whether a wireless connection is available. When the decision 308 determines that a wireless connection is not available, then the automated synchronization process 300 returns to repeat the decision 302 and subsequent blocks. Alternatively, when the decision 308 determines that a wireless connection is available, then a wireless connection is established 310 between the host computer and the media device. After the wireless connection has been established 310, a decision 312 determines whether the host computer is associated with the media player. As noted above, a unique identifier can be used in determining whether the host computer is associated with the media player. When the decision 312 determines that the host computer is not associated with the media player, then the wireless connection is closed 314 and the automated synchronization process 300 returns to repeat the decision 302 and subsequent blocks. On the other hand, when the decision 312 determines that the host computer is associated with the media player, the media content between the media player and the host computer can be synchronized 316 over the wireless connection.

Alternatively, when the decision 302 determines that the media player is wire connected to the host computer, the blocks 304-314 can be skipped, and the automated synchronization process 300 can synchronize 316 the media content between the media player and the host computer over the wire connection. Following the synchronization 316, the automated synchronization process 300 is complete and ends.

Figure 4:
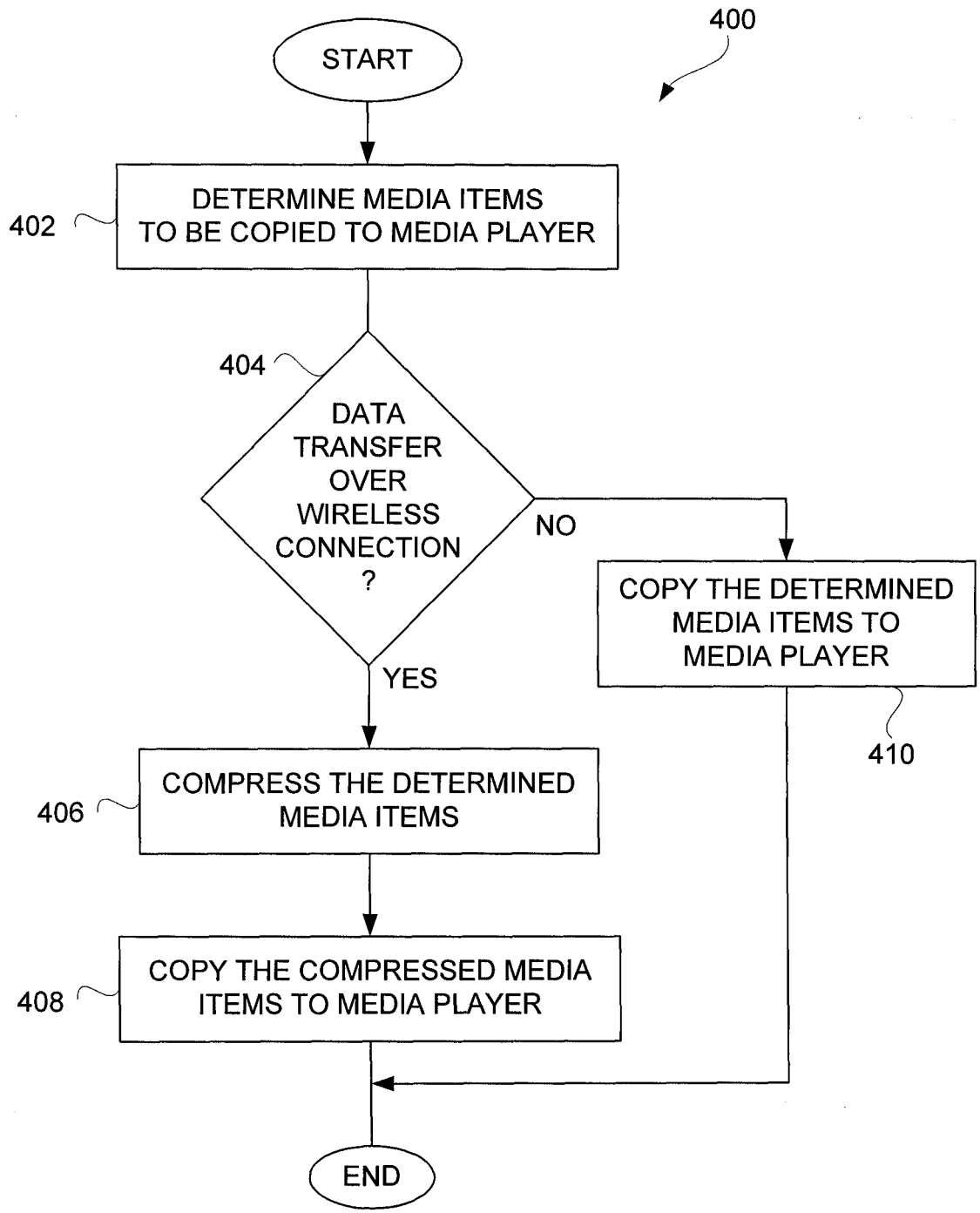
FIG. 4 is a flow diagram of a media transfer process according to one embodiment of the invention.

FIG. 4 is a flow diagram of a media transfer process 400 according to one embodiment of the invention. The media transfer process 400 is, for example, processing performed by the block 208 illustrated in FIG. 2 or the block 316 illustrated in FIG. 3B. As an example, the media transfer process 400 can be performed by the host computer 102 illustrated in FIG. 1. It is assumed that the host computer and the media player are connected by one or both of a wireless connection and a wired connection.

The media transfer process 400 initially determines 402 one or more media items to be copied to the media player. Next, a decision 404 determines whether the data (e.g., media content and media information) associated with the media items is to be transferred over a wireless connection. When the decision 404 determines that the data transfer is to be performed over a wireless connection, the one or more determined media items can be compressed 406. The compression of the determined media items operates to reduce the amount of data (e.g., media content) that needs to be transmitted. In one embodiment, the reduction in data corresponds to a reduction in quality. Hence, when delivering the determined media items over a wireless connection, the use of compression can minimize or reduce the amount of data that is being transferred. In one implementation, those media items being transferred in the compressed manner can be marked so that subsequently, when a wired connection is available, these marks can be used to identify those reduced quality versions that can be upgraded or replaced by full quality versions. After the determined media items have been compressed 406, the compressed media items are copied 408 to the media player over the wireless connection.

On the other hand, when the decision 404 determines that the data transfer is not to be performed over a wireless connection, the determined media items are copied 410 to the media player over the wired connection without use of compression. Following the blocks 408 and 410, the media transfer process 400 is complete and ends.

Figure 5:
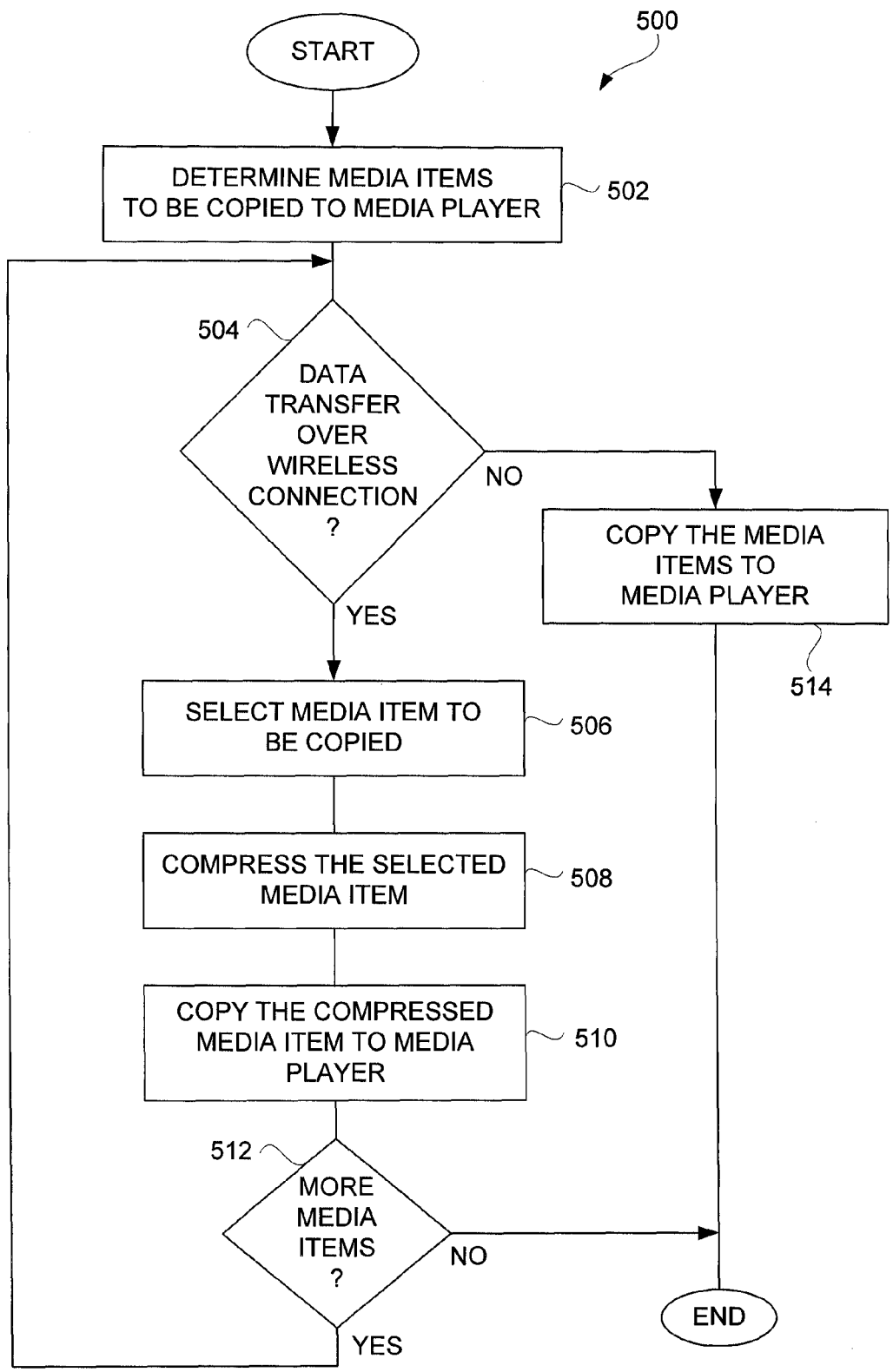
FIG. 5 is a flow diagram of a media transfer process according to another embodiment of the invention.

FIG. 5 is a flow diagram of a media transfer process 500 according to another embodiment of the invention. The media transfer process 500 is, for example, processing performed by the block 208 illustrated in FIG. 2 or the block 316 illustrated in FIG. 3B. As an example, the media transfer process 500 can be performed by the host computer 102 illustrated in FIG. 1.

The media transfer process 500 initially determines 502 one or more media items to be copied to the media player. A decision 504 determines whether data transfer is able to be performed over a wireless connection. When the decision 504 determines that data transfer can be performed over the wireless connection, one of the determined media items is selected 506 to be copied. Next, the selected media item can be compressed 508 to reduce its data size. As an example, the compression 508 of the selected media item can be performed by reducing quality of the selected media item. Next, the compressed media item is copied 510 to the media player. Thereafter, a decision 512 determines whether there are more determined media items to be processed. When the decision 512 determines that there are more determined media items to be processed, the media transfer process 500 returns to repeat the decision 504 and subsequent operations so that each determined media item can be copied to the media player. In any case, once the decision 512 determines that there are no more determined media items to be processed, the media transfer process 500 is complete and ends.

Alternatively, when the decision 504 determines that data transfer is not to be performed over the wireless connection, the determined media items are copied 514 to the media player over a wired connection without use of compression. For data transfer to occur, at least one of the wireless connection and the wired connection are needed. After the media items have been copied 514 to the media player via the wired connection, the media transfer process 500 is complete and ends.

It should be noted that the media transfer process 500 can determine whether data transfer can be performed over a wireless connection on a media item by media item basis. Usually, if available, the wired connection would be used to transfer the data since it has substantially better performance than the wireless connection. For example, if ten (10) media items are to be transferred from the host computer to the media player, then initially when only a wireless connection is available, the first five (5) media items are transferred via the wireless connection; however, when a wired connection subsequently becomes available, the last five (5) media items can be transferred via the wired connection. If neither the wired connection nor the wireless connection are available, then the media items cannot be copied or synchronized at such time.

Figure 6:
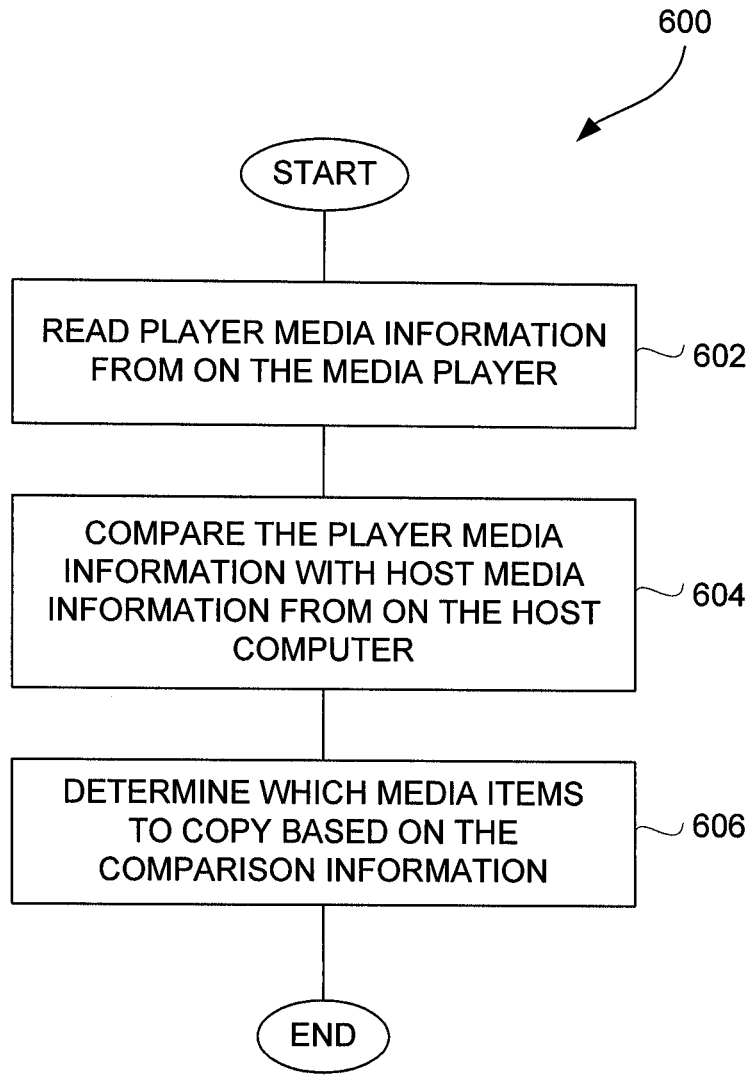
FIG. 6 is flow diagram of determination processing according to one embodiment of the invention.

FIG. 6 is flow diagram of determination processing 600 according to one embodiment of the invention. The determination processing 600 is, for example, performed by a host computer, such as the host computer 102 illustrated in FIG. 1. The determination processing 600 is, for example, processing performed by the determining block 402 of FIG. 4 or the determining block 502 of FIG. 5.

The determination processing 600 initially reads 602 player media information from a media player. In one embodiment the player media information can be read from a media database on the media player. Next, the player media information is compared 604 with first media information from a host computer. Such comparison produces comparison information concerning differences between the player media information and the host media information. In one embodiment, the first media information can be obtained from a media database at the host computer. Thereafter, the determination processing 600 determines 606 one or more media items to copy between the host computer and the media player based on the comparison information. For example, media items (e.g., audio files for songs) can be compared using media information such as song title, album name and/or artist name, which pertain to characteristics or attributes of the media items. Hence, by using the media information to compare media items, the determination processing 600 is able to intelligently determine 606 the one or more media items to be copied.

Although the determination processing 600 can make use of media databases at the host computer and the media player, in another embodiment, the needed host media information and the player media information can be gathered from the media items themselves. In one implementation, such media information can be acquired from metadata provided with the media items. However, by providing metadata in the media databases, synchronization is able to be performed more efficiently and quickly.

According to one embodiment, the comparison of player media information and host media information is performed using media attributes of the various media items. Namely, a media item on the media player can be deemed the same media item as one resident on the host computer if its media attributes sufficiently match. The media information includes media attributes. Examples of media attributes include title, album, track, artist, composer and genre. These attributes are specific to a particular media item. In addition, other media attributes can pertain to quality characteristics of the media item. Examples of such media attributes include bit rate, sample rate, equalizer setting, volume adjustment, start/stop and total time. Hence, in one embodiment, if the above-identified media attributes (e.g., title, album, track, artist and composer) pertaining to a media item on the media player all match those same media attributes pertaining to a media item on the host computer, then the two media items stored on different devices can be deemed the same even though still further attributes or characteristics may cause these media items to not be exact duplications of one another. For example, if modification dates associated with files respectively storing the media items were different, this difference in modification date would not trigger the copying of such media items from the host computer to the media player when the above-identified media attributes match.

Figure 7A:
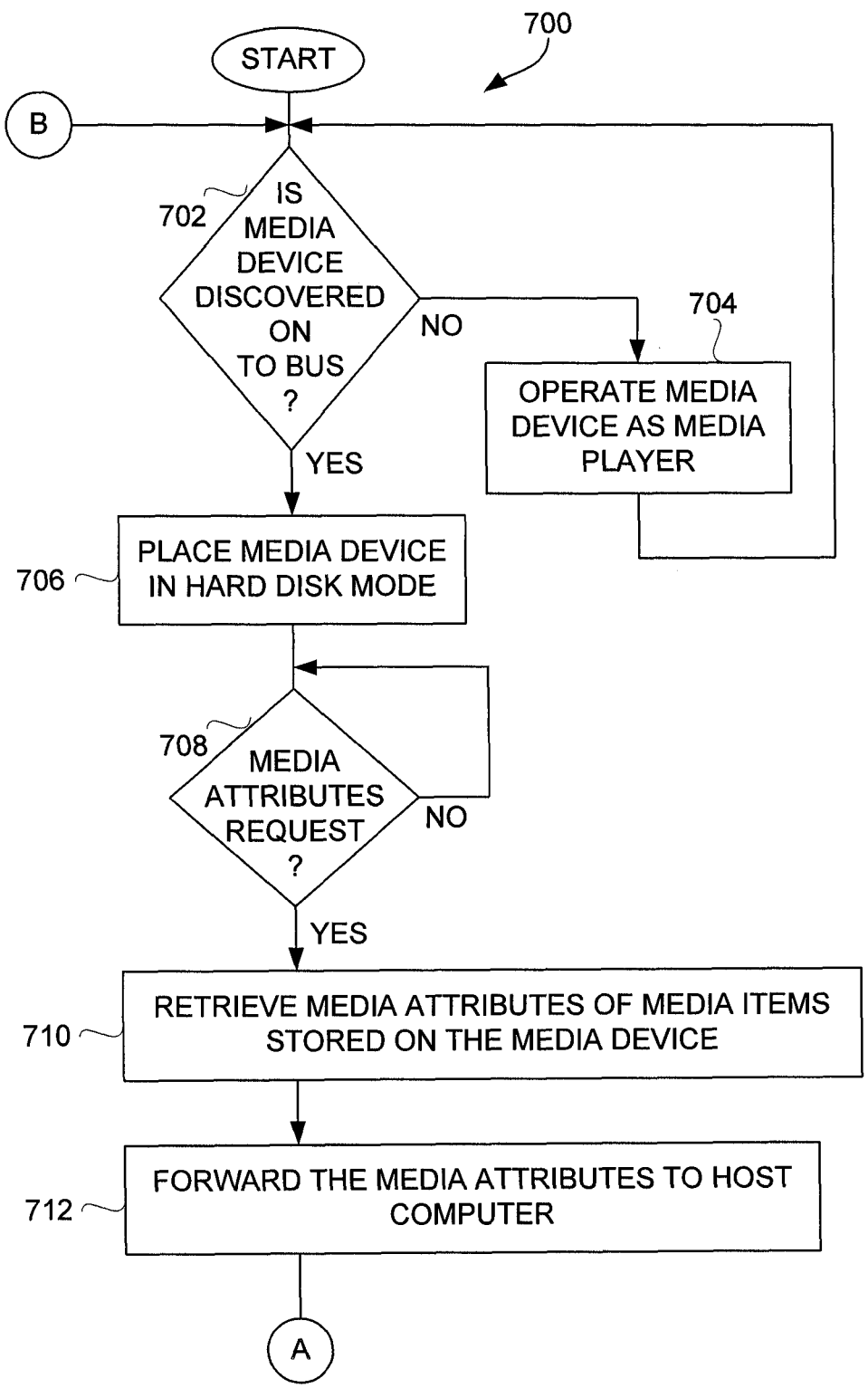
FIGS. 7A and 7B are flow diagrams of media device synchronization processing according to one embodiment of the invention.
Figure 7B:
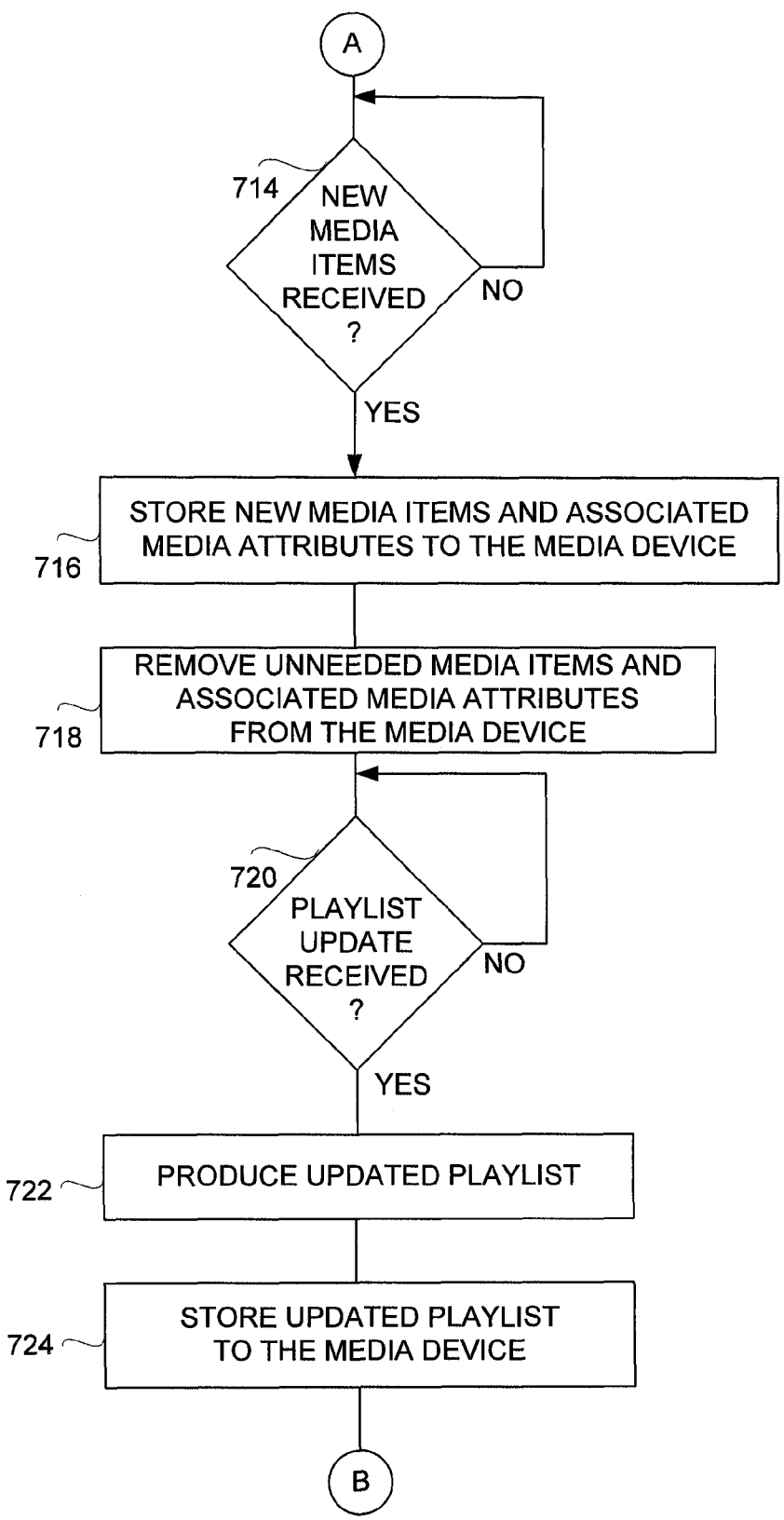

FIGS. 7A and 7B are flow diagrams of media device synchronization processing 700 according to one embodiment of the invention. The media device synchronization processing 700 is performed by a media device that interacts with a host computer over a network. The network can be a wired network or a wireless network. As an example, the host computer can be the host computer 102 and the media device can be the media player 108 as are illustrated in FIG. 1, though a wired network is not shown.

The media device synchronization processing 700 is generally operative on the media device when the media device is powered on. Initially, a decision 702 determines whether the media device has recently been coupled to a bus. The decision 702 can be performed periodically to check for a recent connection to a bus or can be triggered by hardware detection of connection to a bus. The bus is a communication bus coupled to the host computer. In one embodiment, the bus is a serial bus such as FIREWIRE™ or Universal Serial Bus (USB). In another embodiment, the bus is a wireless bus such as 802.11 and the like. When the decision 702 determines that the media device has not recently been coupled to a bus, then the media device is operated 704 as a media player. In such a mode, the media device can operate to browse, search or play media items for its user. The media items can, for example, be audio items (e.g., songs) that are able to be played. Following the operation 704, the media device synchronization processing 700 returns to repeat the decision 702 and subsequent operations.

On the other hand, when the decision 702 determines that the media device has recently been coupled to the bus, then the media device is placed in a hard disk mode. In the hard disk mode, the media device acts as an external hard drive to the host computer. A decision 708 then determines whether the host computer has requested media attributes for the media items residing on the media device. When the decision 708 determines that the host computer is not requesting media attributes, the media device can, but need not, perform other hard drive operations for non-synchronization purposes (not shown). When the decision 708 determines that the host computer is requesting media attributes (i.e., such as through a read operation), then the media attributes of the media items stored on the media device are retrieved 710. After the media attributes are retrieved 710, the media attributes are forwarded 712 to the host computer.

Next, a decision 714 determines whether new media has been received at the media device from the host computer. In other words, in an effort to synchronize the media content residing on the media device with the media content residing at the host computer, the media device will often receive media content from the host computer. Hence, the decision 714 determines whether new media items have been or are presently being received. When the decision 714 determines that such new media items have not been received, then the media device synchronization processing 700 can await such new media items. While waiting for new media items, the media device can, but need not, perform other hard drive operations for non-synchronization purposes (not shown). More generally, other hard disk operations can occur concurrently with synchronization operations. On the other hand, when the decision 714 determines that new media items have been received from the host computer, then the new media items and their associated media attributes are stored 716 to the media device. In one embodiment, the new media items are stored into files on the media device, and the associated media attributes pertaining to the media items are stored in a media database residing on the media device. Additionally, any unneeded media items and their associated media attributes can be removed 718 from the media device. Hence, in this embodiment, by synchronizing the media content residing on the media device with that on the host computer, new media items are not only stored to the media device, but unneeded (e.g., old) media items and their associated media attributes are also removed from the media device.

Following the operation 718, a decision 720 determines whether a playlist update has been received. When the decision 720 determines that a playlist update has not been received, then the media device synchronization processing 700 can await such a playlist update. Alternatively, when the decision 720 determines that a playlist update has been received, then an updated playlist for the media device is produced 722. The playlist update could be the updated playlist or could be instructions to update an existing playlist. The updated playlist is then stored 722 to the media device.

In effect, one or more playlists at the host computer can be synchronized with the media device and thus made available to the media device. A playlist identifies particular media items that are to be played in a sequence. In general, a playlist can be considered an ordered list of media items. Internally, according to one embodiment, the playlist can be represented in a media database as a data structure that points to files of the appropriate media items residing on the storage device within the media device. Hence, for a given playlist, the pointers to the files of the appropriate media items on the media device will differ from the pointers to the files for the same media items on the host computer, thus the need to update the pointers if a particular playlist is moved between the host computer and the media device.

Figure 8A:
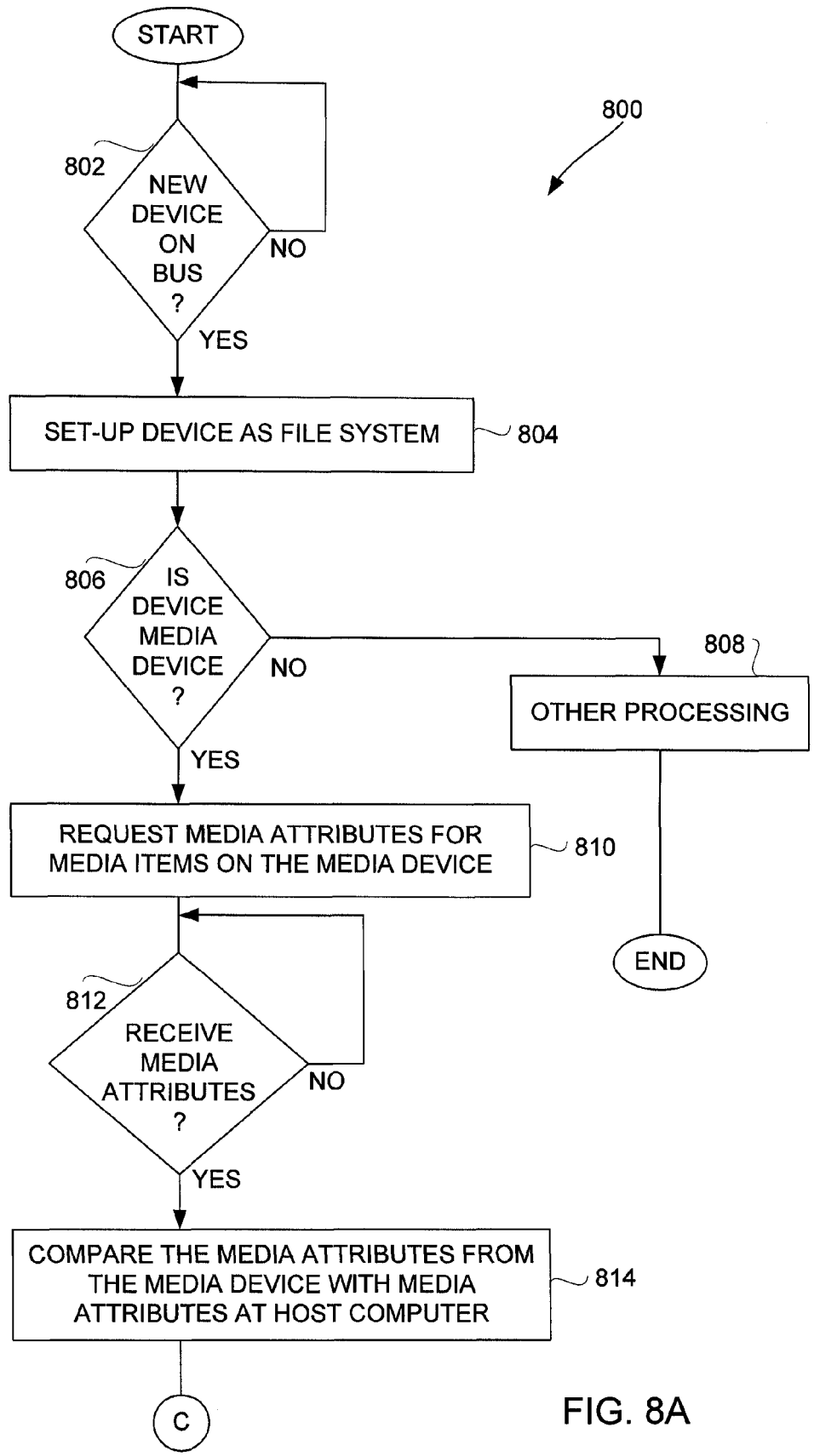
FIGS. 8A and 8B are flow diagrams of host computer synchronization processing according to one embodiment of the invention.
Figure 8B:
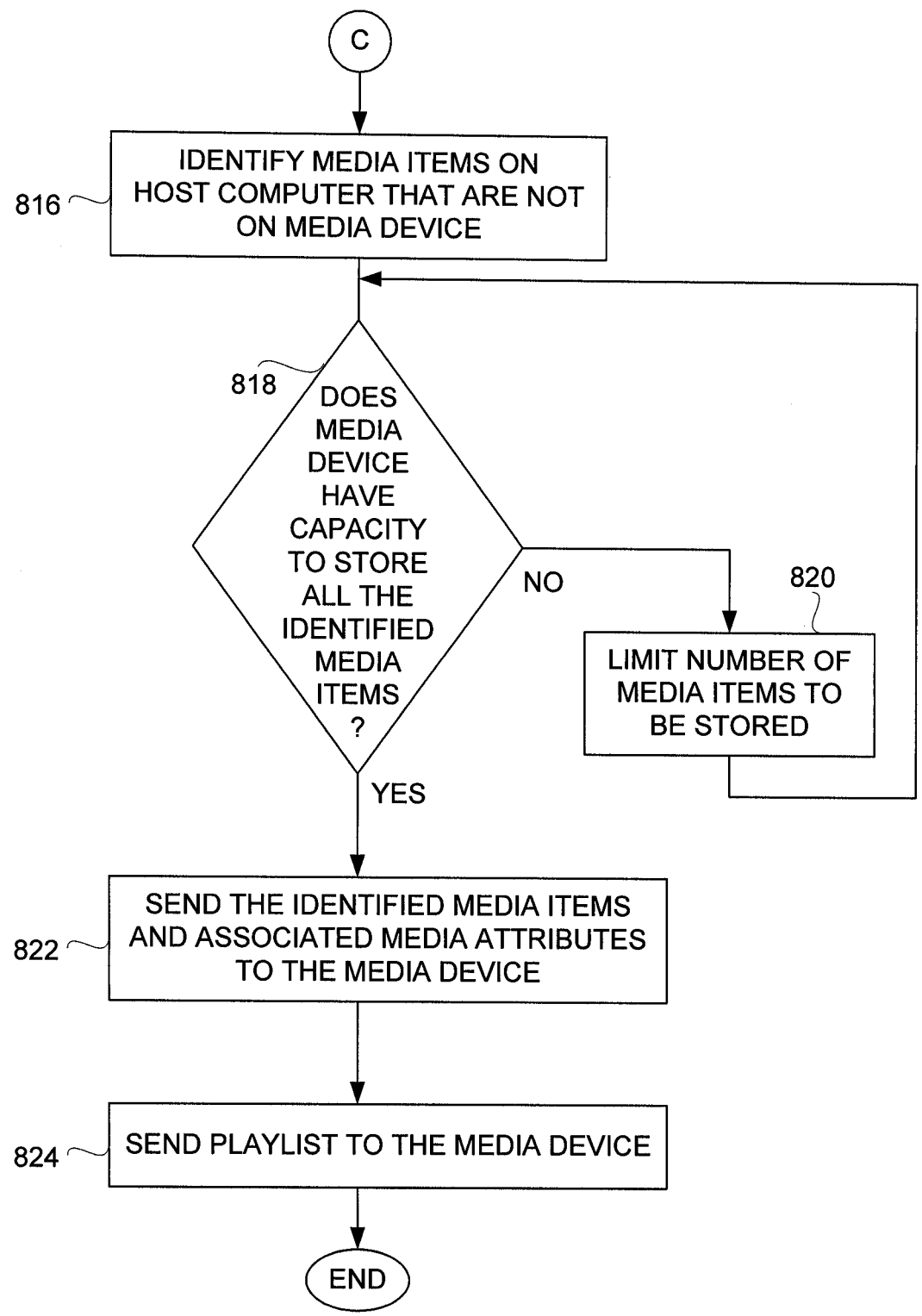

FIGS. 8A and 8B are flow diagrams of host computer synchronization processing 800 according to one embodiment of the invention. The host computer synchronization processing 800 is, for example, performed by a host computer. The host computer can, for example, be the host computer 102 illustrated in FIG. 1. The host computer synchronization processing 800 is, for example, counterpart processing to the media device synchronization processing 700 performed by a media device that interacts with the host computer over a network. The network can be a wired network or a wireless network.

The host computer synchronization processing 800 begins with a decision 802 which determines whether any new devices have been discovered on a network. The network can be a wired network, such as a wired peripheral bus. The network can also be a wireless network. In one implementation, the monitoring of the network is limited to a particular category of devices (e.g., FIREWIRE™ or USB devices). Such monitoring can, for example, be performed by polling the device(s) on the network or by receiving a new device alert. When the decision 802 determines that no new devices have been discovered, then the host computer synchronization processing 800 awaits the presence of a new device. Once the decision 802 determines that a new device is present on the network, then the device is set-up 804 as a file system with respect to the host computer. As such, an operating system for the host computer is able to access (read, write and delete) files with respect to the file system (i.e., the new device).

Next, a decision 806 determines whether the device that is now present on the network is a media device. When the decision 806 determines that the device is not a media device, then other processing 808 can be performed. Such other processing 808 is unrelated to synchronization processing and thus not further described herein. Following the other processing 808, the host computer synchronization processing 800 is complete and ends with synchronization not having been performed.

On the other hand, when the decision 806 determines that the device is a media device, then media attributes for media items on the media device are requested 810. Typically, the media attributes for all the media items residing on the media device would be retrieved. A decision 812 then determines whether the media attributes have been received. When the decision 812 determines that the media attributes have not yet been received, then the host computer synchronization processing 800 can await their receipt. Once the decision 812 determines that the media attributes have been received, then the media attributes from the media device are compared 814 with media attributes for the media items residing on the host computer. Here, the comparison 814 of media attributes with respect to the media device and the host computer results in comparison information. The comparison information indicates directly or indirectly which media items are present at the host computer but not present at the media device as well as which media items are present at the media device but not present at the host computer. Following the comparing 814, the media items on the host computer that are not on the media device are identified 816.

Next, a decision 818 determines whether the media device has the capacity to store all the identified media items. Here, the decision 818 determines whether the media device has sufficient storage capacity to store the one or more media items that have been identified 816 as on the host computer but not on the media device. When the decision 818 determines that the media device does not have sufficient capacity, then the number of media items to be stored is limited 820. There are numerous ways to limit the number of media items to be stored. For example, one or more of the media items to be stored can be de-selected (i.e., not selected) such that they are not to be stored to the media device. The one or more media items to be de-selected can be chosen in a variety of different ways. For example, the one or more items to be de-selected could be chosen randomly, chosen based on file size, chosen based on position in playlist, etc. Following the operation 820, the host computer synchronization processing 800 returns to repeat the decision 818 and subsequent operations.

When the decision 818 determines that the media device has sufficient capacity to store all of the identified media items, the identified media items and their associated media attributes are sent to the media device. Here, the remaining identified media items and their associated media attributes are sent (i.e., copied) from the host computer to the media device where they are to be stored. A playlist can also be sent 824 to the media device. The playlist can represent a new playlist or an updated version of a previously existing playlist. Before sending 824 the playlist to the media device, the playlist can be modified for use on the media device. Alternatively, the media device itself could update the playlist for use on the media device.

Additionally, although not illustrated in FIGS. 8A and 8B, according to another embodiment, the host computer synchronization processing 800 at operation 814 can also identify those of the media items on the media device that are not on the host computer. Then, the host computer can operate to interact with the media device to remove (e.g., delete) those media items stored on the media device that are not stored at the host computer. Such additional processing would be performed after the operation 816 and prior to the decision 818 so that the storage capacity of the media device can be fully utilized.

The media device synchronization processing 700 and the host computer synchronization processing 800 interact to synchronize media items on the media device to those media items on the host computer. Such synchronization can consider all media items or can be limited to synchronizing only a subset of media content, such as media items pertaining to one or more playlists. The media attribute comparison provided by the invention can be facilitated through the use of databases, both on the host computer and on the media device.

In one implementation, the host computer synchronization processing 800 can utilize an application resident on the host computer to perform the comparison and updating of the media items and their attributes between the host computer and the media device. One such application is iTunes, version 2.0, produced by Apple Computer, Inc. of Cupertino, Calif.

Figure 9:
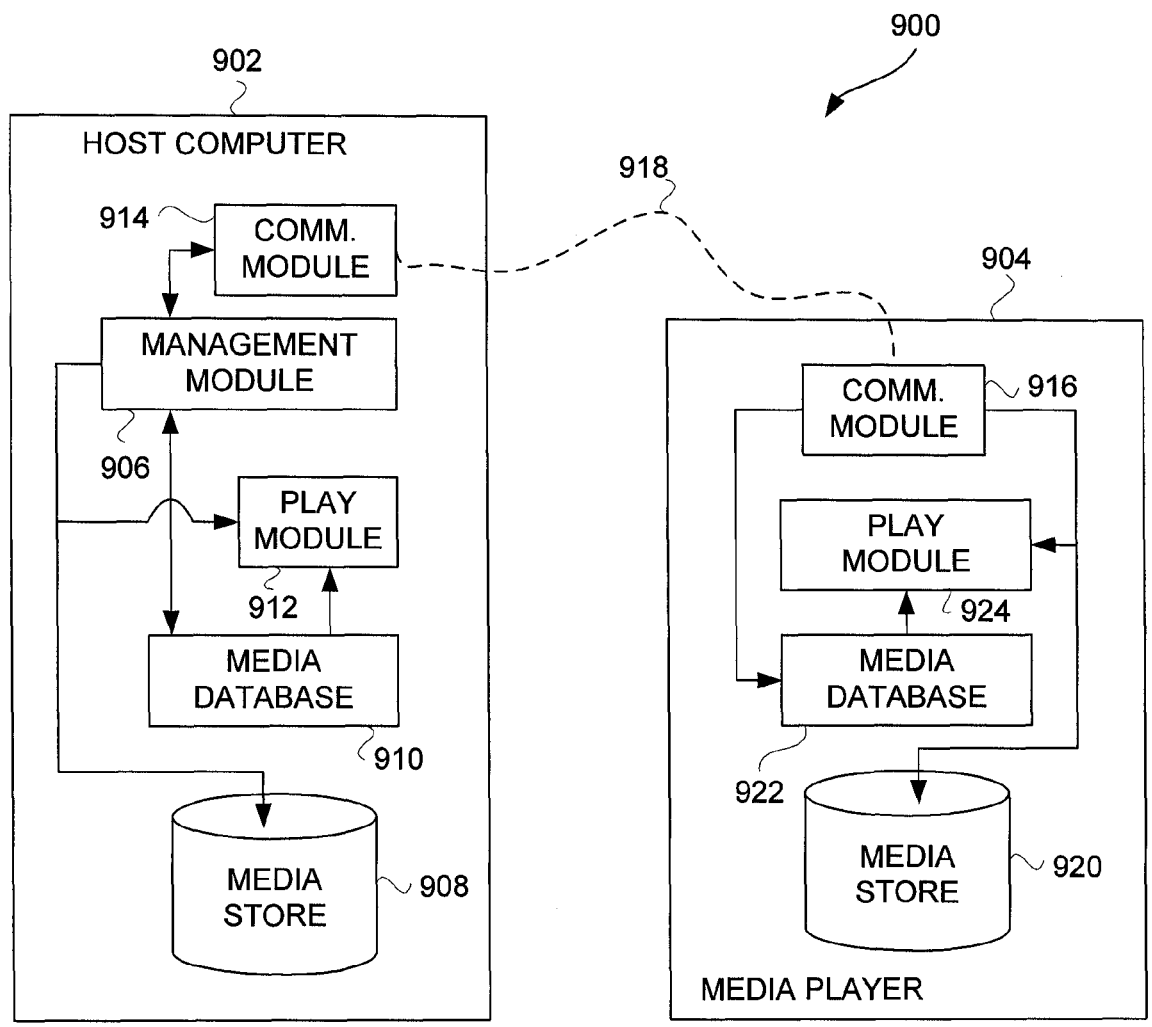
FIG. 9 is a block diagram of a media management system according to one embodiment of the invention.

FIG. 9 is a block diagram of a media management system 900 according to one embodiment of the invention. The media management system 900 includes a host computer 902 and a media player 904. The host computer 902 is typically a personal computer. The host computer, among other conventional components, includes a management module 906 which is a software module. The management module 906 provides for centralized management of media items (and/or playlists) not only on the host computer 902 but also on the media player 904. More particularly, the management module 906 manages those media items stored in a media store 908 associated with the host computer 902. The management module 906 also interacts with a media database 910 to store media information associated with the media items stored in the media store 908.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 902 includes a play module 912. The play module 912 is a software module that can be utilized to play certain media items stored in the media store 908. The play module 912 can also display (on a display screen) or otherwise utilize media information from the media database 910. Typically, the media information of interest corresponds to the media items to be played by the play module 912.

The host computer 902 also includes a communication module 914 that couples to a corresponding communication module 916 within the media player 904. A connection or link 918 removeably couples the communication modules 914 and 916. In one embodiment, the connection or link 918 is a cable that provides a data bus, such as a FIREWIRE™ bus or USB bus, which is well known in the art. In another embodiment, the connection or link 918 is a wireless channel or connection through a wireless network. Hence, depending on implementation, the communication modules 914 and 916 may communicate in a wired or wireless manner.

The media player 904 also includes a media store 920 that stores media items within the media player 904. The media items being stored to the media store 920 are typically received over the connection or link 918 from the host computer 902. More particularly, the management module 906 sends all or certain of those media items residing on the media store 908 over the connection or link 918 to the media store 920 within the media player 904. Additionally, the corresponding media information for the media items that is also delivered to the media player 904 from the host computer 902 can be stored in a media database 922. In this regard, certain media information from the media database 910 within the host computer 902 can be sent to the media database 922 within the media player 904 over the connection or link 918. Still further, playlists identifying certain of the media items can also be sent by the management module 906 over the connection or link 918 to the media store 920 or the media database 922 within the media player 904.

Furthermore, the media player 904 includes a play module 924 that couples to the media store 920 and the media database 922. The play module 924 is a software module that can be utilized to play certain media items stored in the media store 920. The play module 924 can also display (on a display screen) or otherwise utilize media information from the media database 922. Typically, the media information of interest corresponds to the media items to be played by the play module 924.

Hence, in one embodiment, the media player 904 has limited or no capability to manage media items on the media player 904. However, the management module 906 within the host computer 902 can indirectly manage the media items residing on the media player 904. For example, to "add" a media item to the media player 904, the management module 906 serves to identify the media item to be added to the media player 904 from the media store 908 and then causes the identified media item to be delivered to the media player 904. As another example, to "delete" a media item from the media player 904, the management module 906 serves to identify the media item to be deleted from the media store 908 and then causes the identified media item to be deleted from the media player 904. As still another example, if changes (i.e., alterations) to characteristics of a media item were made at the host computer 902 using the management module 906, then such characteristics can also be carried over to the corresponding media item on the media player 904. In one implementation, the additions, deletions and/or changes occur in a batch-like process during synchronization of the media items on the media player 904 with the media items on the host computer 902.

In another embodiment, the media player 904 has limited or no capability to manage playlists on the media player 904. However, the management module 906 within the host computer 902 through management of the playlists residing on the host computer can indirectly manage the playlists residing on the media player 904. In this regard, additions, deletions or changes to playlists can be performed on the host computer 902 and then by carried over to the media player 904 when delivered thereto.

As previously noted, synchronization is a form of media management. The ability to automatically initiate synchronization was also previously discussed. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 10:
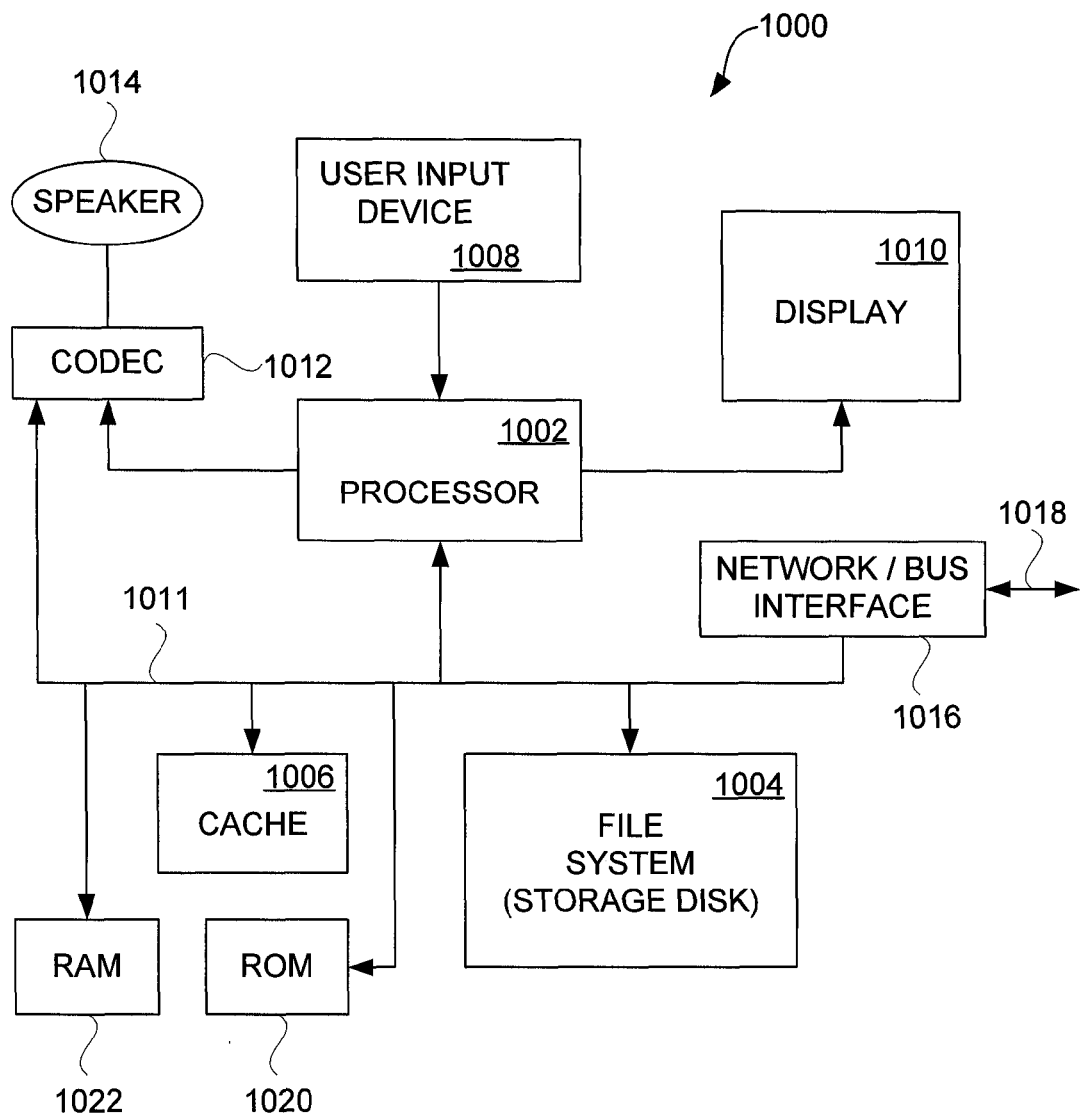
FIG. 10 is a block diagram of a media player according to one embodiment of the invention.

FIG. 10 is a block diagram of a media player 1000 according to one embodiment of the invention. The media player 1000 includes a processor 1002 that pertains to a microprocessor or controller for controlling the overall operation of the media player 1000. The media player 1000 stores media data pertaining to media items in a file system 1004 and a cache 1006. The file system 1004 is, typically, a storage disk or a plurality of disks. The file system 1004 typically provides high capacity storage capability for the media player 1000. However, since the access time to the file system 1004 is relatively slow, the media player 1000 can also include a cache 1006. The cache 1006 is, for example, Random-Access Memory (RAM) provided by semiconductor memory. The relative access time to the cache 1006 is substantially shorter than for the file system 1004. However, the cache 1006 does not have the large storage capacity of the file system 1004. Further, the file system 1004, when active, consumes more power than does the cache 1006. The power consumption is often a concern when the media player 1000 is a portable media player that is powered by a battery (not shown). The media player 1000 also includes a RAM 1020 and a Read-Only Memory (ROM) 1022. The ROM 1022 can store programs, utilities or processes to be executed in a non-volatile manner. The RAM 1020 provides volatile data storage, such as for the cache 1006.

The media player 1000 also includes a user input device 1008 that allows a user of the media player 1000 to interact with the media player 1000. For example, the user input device 1008 can take a variety of forms, such as a button, keypad, dial, etc. Still further, the media player 1000 includes a display 1010 (screen display) that can be controlled by the processor 1002 to display information to the user. A data bus 1011 can facilitate data transfer between at least the file system 1004, the cache 1006, the processor 1002, and the CODEC 1012.

In one embodiment, the media player 1000 serves to store a plurality of media items (e.g., songs) in the file system 1004. When a user desires to have the media player play a particular media item, a list of available media items is displayed on the display 1010. Then, using the user input device 1008, a user can select one of the available media items. The processor 1002, upon receiving a selection of a particular media item, supplies the media data (e.g., audio file) for the particular media item to a coder/decoder (CODEC) 1012. The CODEC 1012 then produces analog output signals for a speaker 1014. The speaker 1014 can be a speaker internal to the media player 1000 or external to the media player 1000. For example, headphones or earphones that connect to the media player 1000 would be considered an external speaker.

The media player 1000 also includes a network/bus interface 1016 that couples to a data link 1018. The data link 1018 allows the media player 1000 to couple to a host computer. The data link 1018 can be provided over a wired connection or a wireless connection. In the case of a wireless connection, the network/bus interface 1016 can include a wireless transceiver.

In another embodiment, a media player can be used with a docking station. The docking station can provide wireless communication capability (e.g., wireless transceiver) for the media player, such that the media player can communicate with a host device using the wireless communication capability when docked at the docking station. The docking station may or may not be itself portable.

The wireless network, connection or channel can be radio-frequency based, so as to not require line-of-sight arrangement between sending and receiving devices. Hence, synchronization can be achieved while a media player remains in a bag, vehicle or other container.

The host device can also be a media player. In such case, the synchronization of media items can between two media players.

Although the media items of emphasis in several of the above embodiments were audio items (e.g., audio files or songs), the media items are not limited to audio items. For example, the media item can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a user is able to manage (e.g., synchronize) a media player with a host computer over a wireless connection. Synchronization can be performed without a physical connection and without any requirement for line-of-sight arrangements. Another advantage of the invention is that synchronization can not only be automatically initiated but also restricted to situations where a media player and a host computer recognize one another. Still another advantage of the invention is that a larger portable device, such as a vehicle, bag or case, can house or contain the media player and also optionally provide wired/wireless communication capability. Yet still another advantage of the invention is that a docking station can receive and provide wired/wireless communication capability for the media player.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for synchronizing media contents between a portable media player and a media host, the media content including a plurality of media items, said method comprising:
   determining one or more of the media items to be copied from the media host to the media player;
   compressing at least a portion of the determined one or more of the media items to be copied prior to their being copied, said compressing forming determined one or more compressed media items to be copied;
   copying the determined one or more compressed media items to be copied from the media host to the media player via a wireless connection when the media player is not connected to the media host by a wired connection and when the media player is associated with the media host; and
   when the media player is connected to the media host by a wired connection and when the media player is associated with the media host:
      copying the determined one or more of the media items to be copied from the media host to the media player via the wire connection; and
      upgrading media content previously copied to the media player in the compressed manner to media content in an uncompressed manner.

2. A method as recited in claim 1, wherein upgrading media content in an uncompressed manner comprises replacing the media content in a compressed manner with the media content in an uncompressed manner.

3. A method as recited in claim 1, wherein the compressed media item pertains to a reduced quality version.

4. A method as recited in claim 3, wherein the media item in the uncompressed manner pertains to a full quality version.

5. A method as recited in claim 1, wherein the media player has a unique identifier, and wherein the media player is deemed associated with the media host if the host has previously stored the unique identifier of the media player in a file at the media host.

6. A method as recited in claim 5, wherein said synchronizing of the media content between the media player and the media host is not performed when said determining determines that the media player is not associated with the media host.

7. A method as recited in claim 1, wherein the media host is a personal computer having a media management application.

8. A method as recited in claim 1, wherein the wireless connection is via a local area wireless network or a direct wireless channel.

9. A method as recited in claim 1, wherein said compressing reduces quality of the at least a portion of the media content by reducing resolution or bit rate.

10. A method as recited in claim 1, wherein said synchronizing further comprises:
   determining whether the media player is connected to the media host by a wired connection so that when the wired connection if available, said copying of the determined one or more of the media items to be copied from the media host to the media player is performed via the wire connection.

11. A method as recited in claim 1, wherein said copying the determined one or more of the media items to be copied of the determined one or more of the compressed media items to be copied from the media host to the media player comprises copying, to the media player, media content and media information for at least one media items stored on the media host.

12. A method as recited in claim 11, wherein the media information includes at least attributes for the at least one media item.

13. A method as recited in claim 12, wherein the attributes include at least two or more of: title, album name, artist name, composer or genre.

14. A method as recited in claim 11, wherein the media information includes at least quality characteristics for the at least one media item.

15. A method as recited in claim 14, wherein the quality characteristics include at least one of: bit rate, sample rate, equalization setting, volume adjustment, start/stop and total time.

16. A non-transitory computer readable storage medium including at least computer program code stored thereon and executable by a computer for synchronizing media contents between a portable media player and a media host, the media content including a plurality of media items, said computer readable medium comprising:
   computer program code for determining one or more of the media items to be copied from the media host to the media player;
   computer program code for compressing at least a portion of the determined one or more of the media items to be copied prior to their being copied, said compressing forming determined one or more compressed media items to be copied;
   computer program code for copying the determined one or more compressed media items to be copied from the media host to the media player via the wireless connection when the media player is not connected to the media host by a wired connection and when the media player is associated with the media host; and
   computer program code for copying the determined one or more of the media items to be copied from the media host to the media player via the wire connection and upgrading media content previously copied to the media player in the compressed manner to media content in an uncompressed manner when the media player is connected to the media host by a wired connection and when the media player is associated with the media host.

17. The computer readable medium as recited in claim 16, wherein upgrading media content comprises replacing the media content in a compressed manner with the media content in an uncompressed manner.

18. The computer readable medium as recited in claim 16, wherein the media player has a unique identifier, and wherein the media player is deemed associated with the media host if the host has previously stored the unique identifier of the media player in a file at the media host.

19. The computer readable medium as recited in claim 18, wherein said synchronizing of the media content between the media player and the media host is not performed when said determining determines that the media player is not associated with the media host.

20. The computer readable medium as recited in claim 16, wherein said synchronizing further comprises:
   determining whether the media player is connected to the media host by a wired connection so that when the wired connection if available, said copying of the determined one or more of the media items to be copied from the media host to the media player is performed via the wire connection.

21. The computer readable medium as recited in claim 16, wherein said copying the determined one or more of the media items to be copied of the determined one or more of the compressed media items to be copied from the media host to the media player comprises copying, to the media player, media content and media information for at least one media items stored on the media host.

22. A system for managing and playing media data, said system comprising:
   a host computer including at least a management module for managing a plurality of media items, a host play module for playing the media items for a user of said host computer, and a host media store for storing a plurality of media items;
   a portable media player including at least a player media store for storing a plurality of media items, and a player play module for playing the media items stored in said media store for a user of said portable media player, and
   a docking station for said portable media player, said docking station including wireless communication circuitry so that said portable media player can receive media items or media information from said host computer over a wireless channel via the wireless communication circuitry, wherein said management module operates to:
   identify one or more media items to be synchronized said portable media player and said host computer;
   compress at least a portion of the media items to be synchronized, forming compressed media items;
   synchronize media items between said portable media player and said host computer once said portable media player is docked into said docking station;
   copy the compressed media items from the media host to the media player via the wireless connection when the media player is not connected to the media host by a wired connection and that the media player is associated with the media host; and
   upgrade media content previously copied to the media player in the compressed manner to media content in an uncompressed manner when the media player is connected to the media host by a wired connection and that the media player is associated with the media host.

23. A system as recited in claim 22, wherein said portable media player includes a player media database storing player media information, and wherein said host computer includes a host media database storing host media information.

24. A system as recited in claim 23, wherein the synchronization of the media items between said portable media player and said host computer is based on a comparison of the player media information with the host media information.

* * * * *